Dec. 19, 1933.  E. L. JONES  1,939,704
RECEPTACLE FILLING AND CLOSING APPARATUS AND MEANS AND METHOD OF
FORMING AND APPLYING A SEAL TO CLOSED RECEPTACLES
Filed July 19, 1930   15 Sheets-Sheet 1

Inventor
E. L. Jones
By his Attorney
John O. Seifert

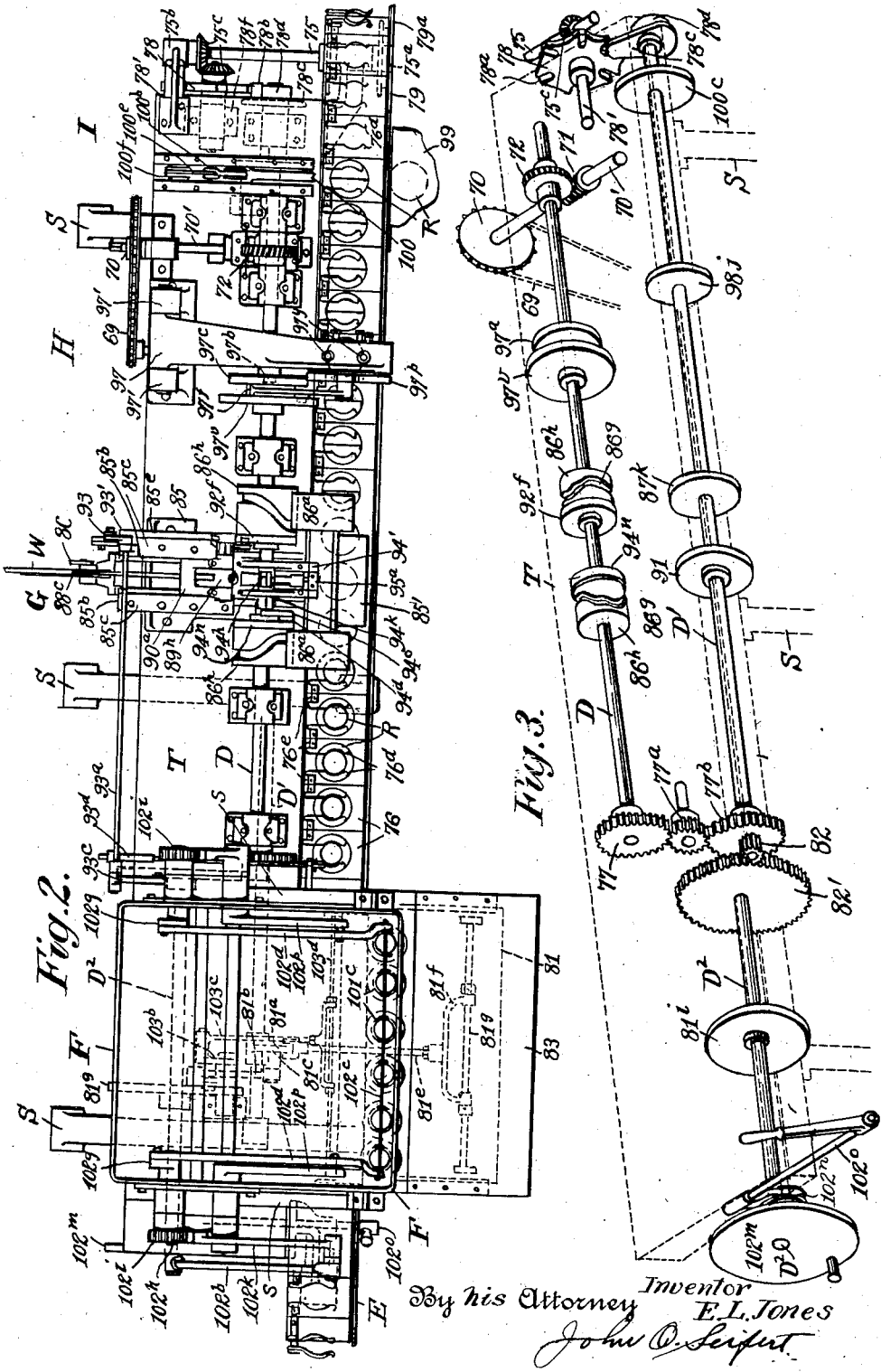

Dec. 19, 1933.　　　　　　　E. L. JONES　　　　　　1,939,704
RECEPTACLE FILLING AND CLOSING APPARATUS AND MEANS AND METHOD OF
FORMING AND APPLYING A SEAL TO CLOSED RECEPTACLES
Filed July 19, 1930　　　　15 Sheets-Sheet 3
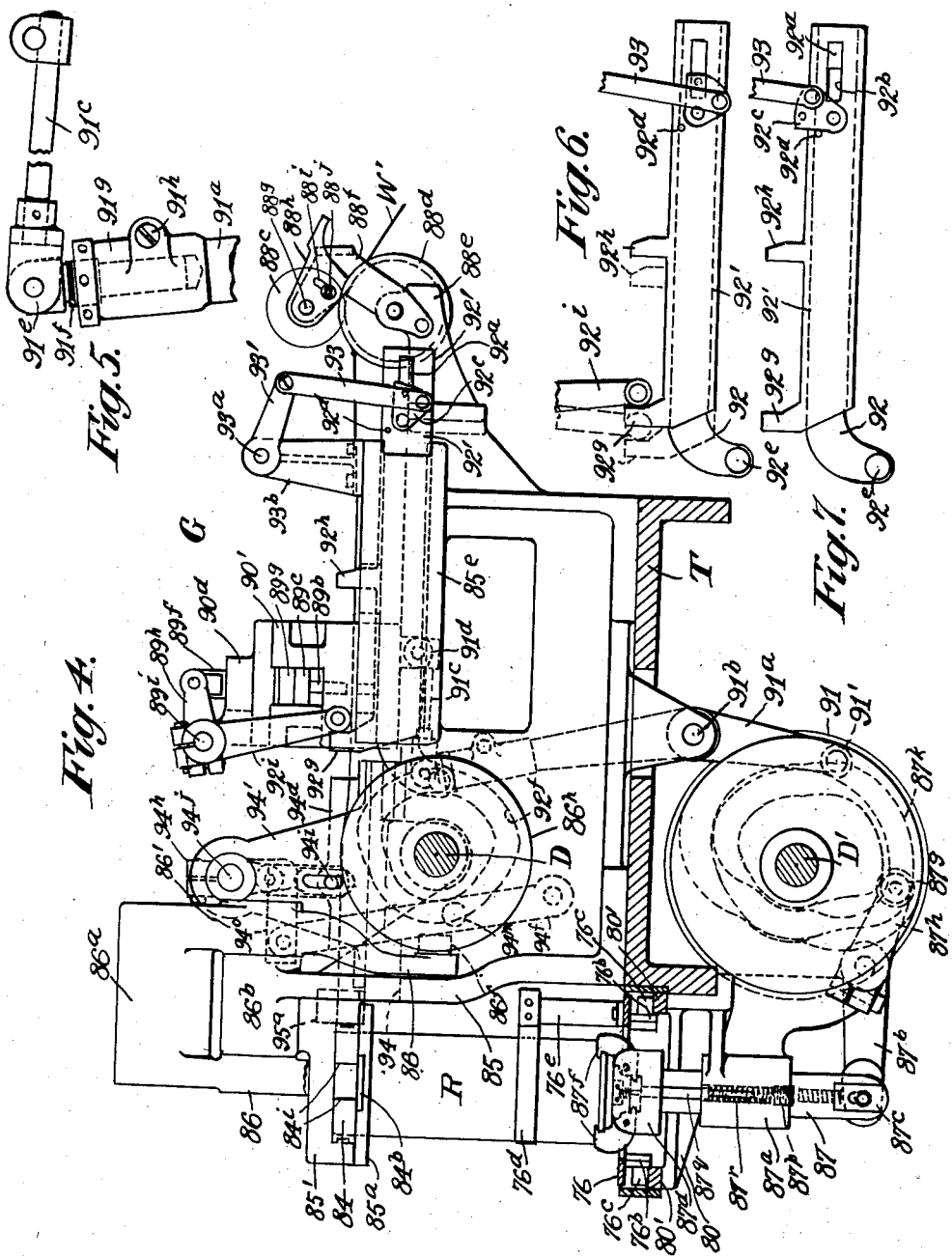
Inventor
E. L. Jones
By his Attorney

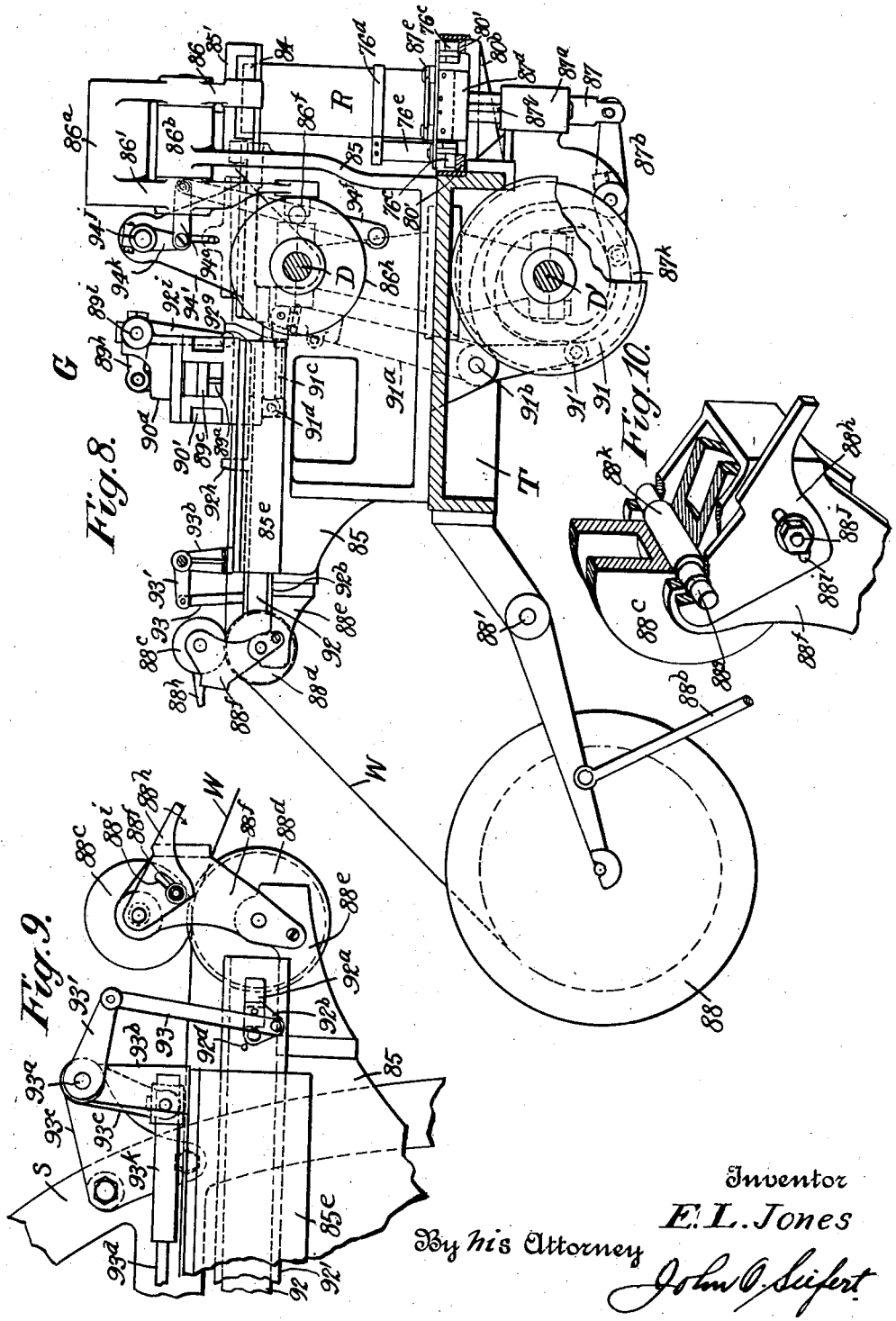

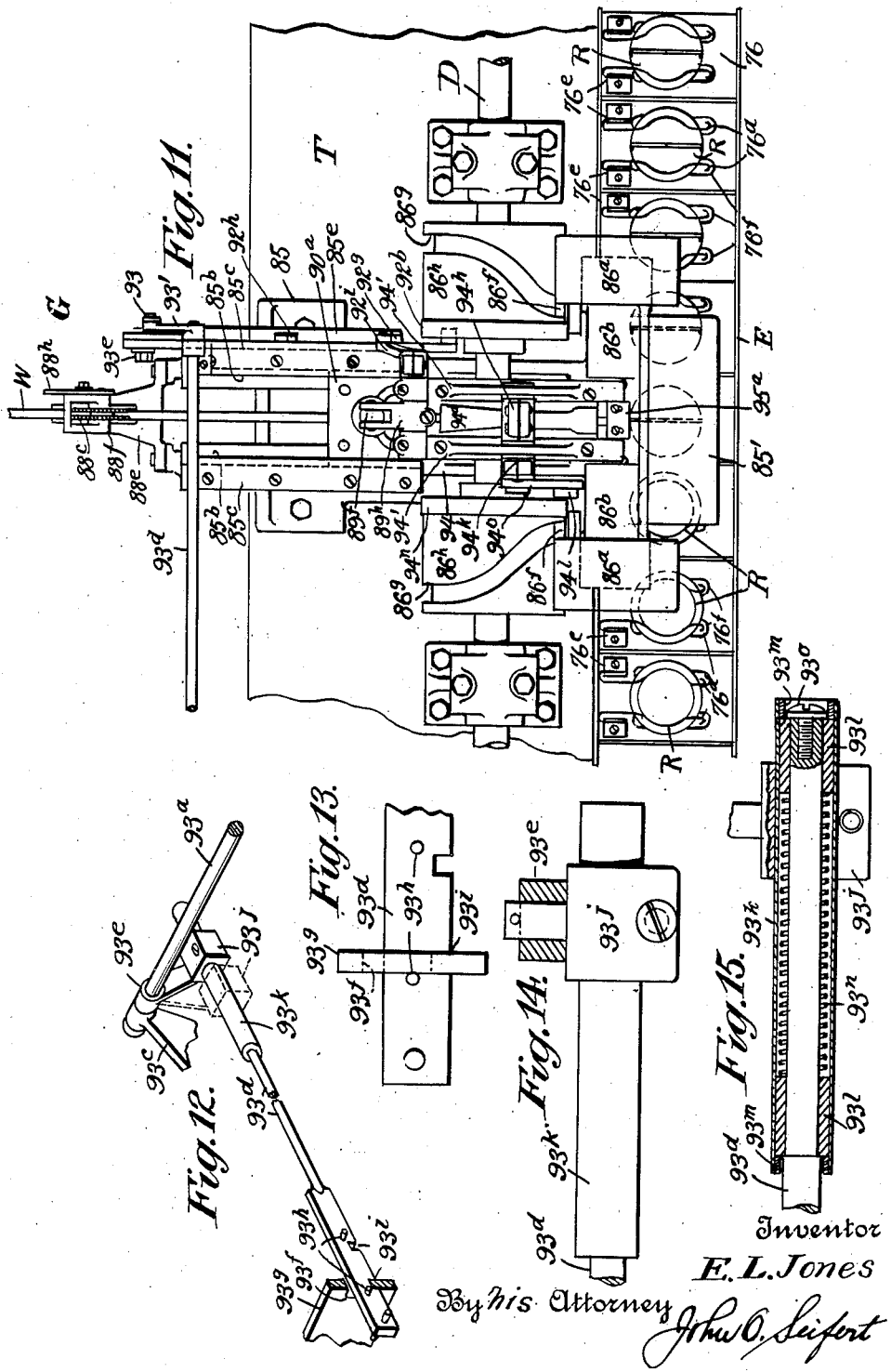

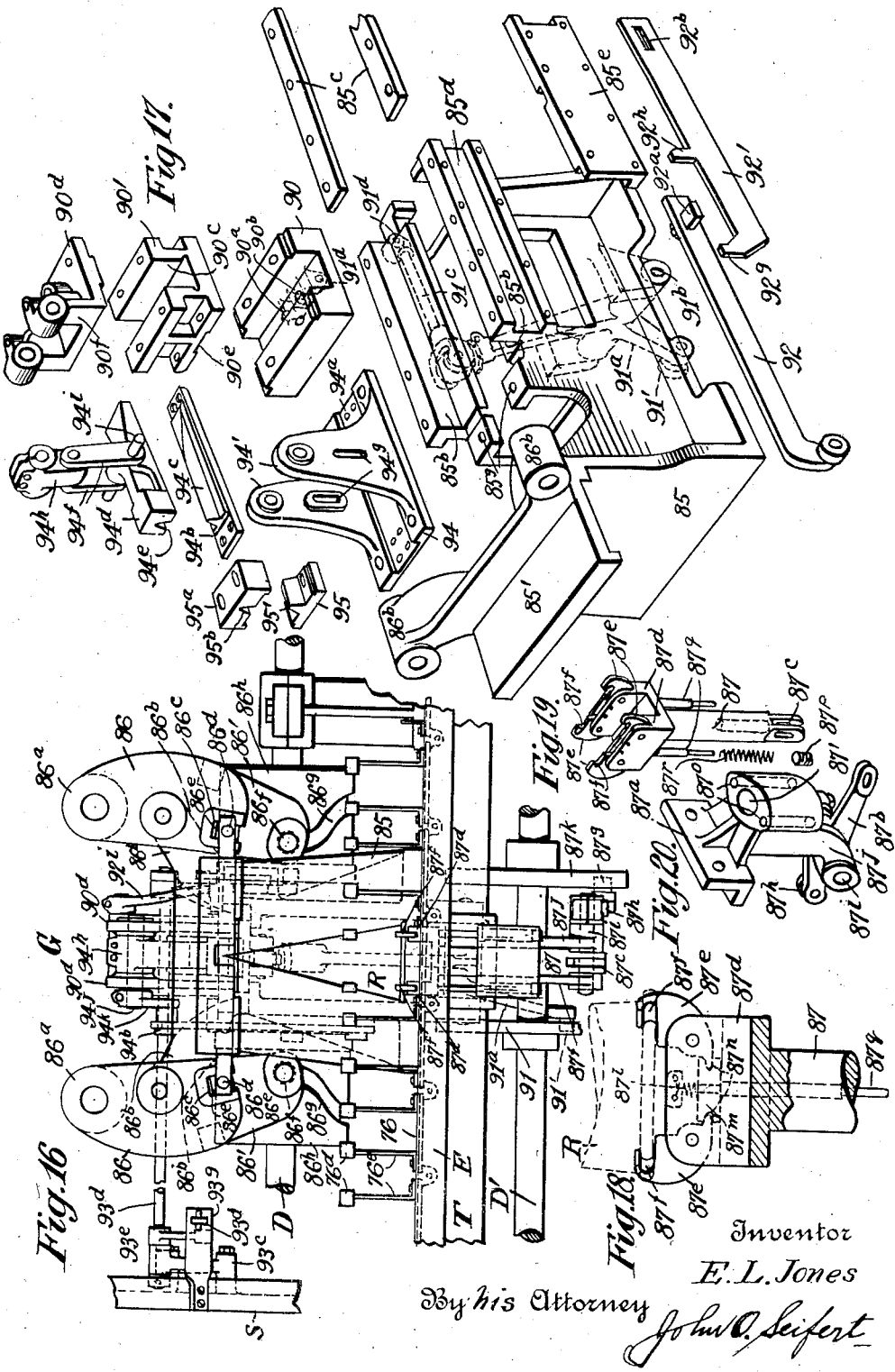

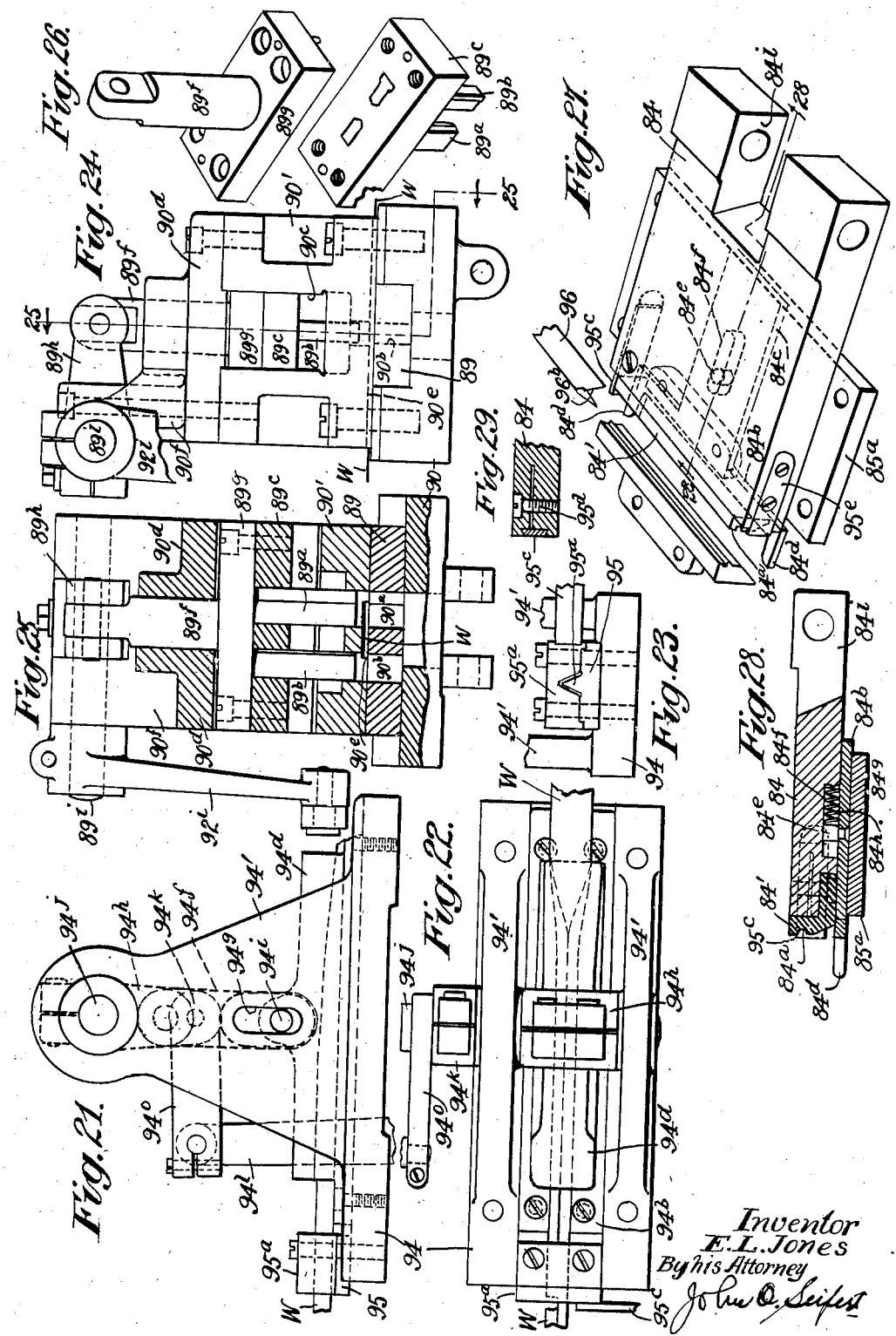

Dec. 19, 1933.  E. L. JONES  1,939,704
RECEPTACLE FILLING AND CLOSING APPARATUS AND MEANS AND METHOD OF
FORMING AND APPLYING A SEAL TO CLOSED RECEPTACLES
Filed July 19, 1930  15 Sheets-Sheet 8
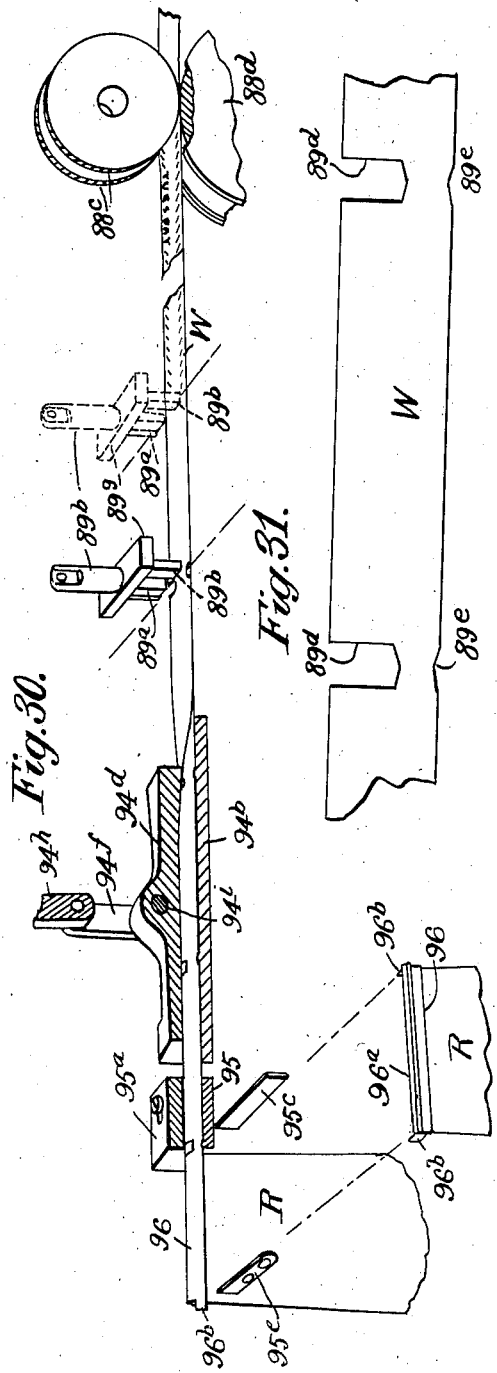
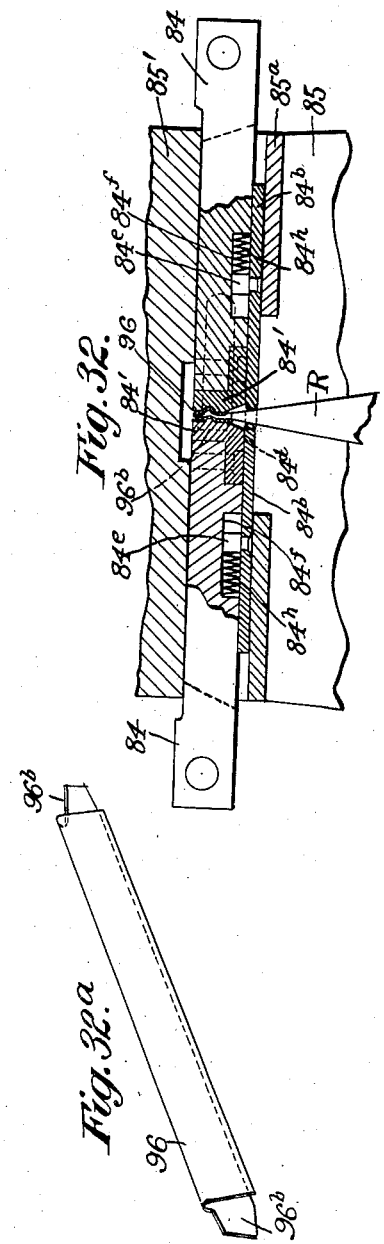
Inventor
E. L. Jones
By his Attorney
John O. Seifert

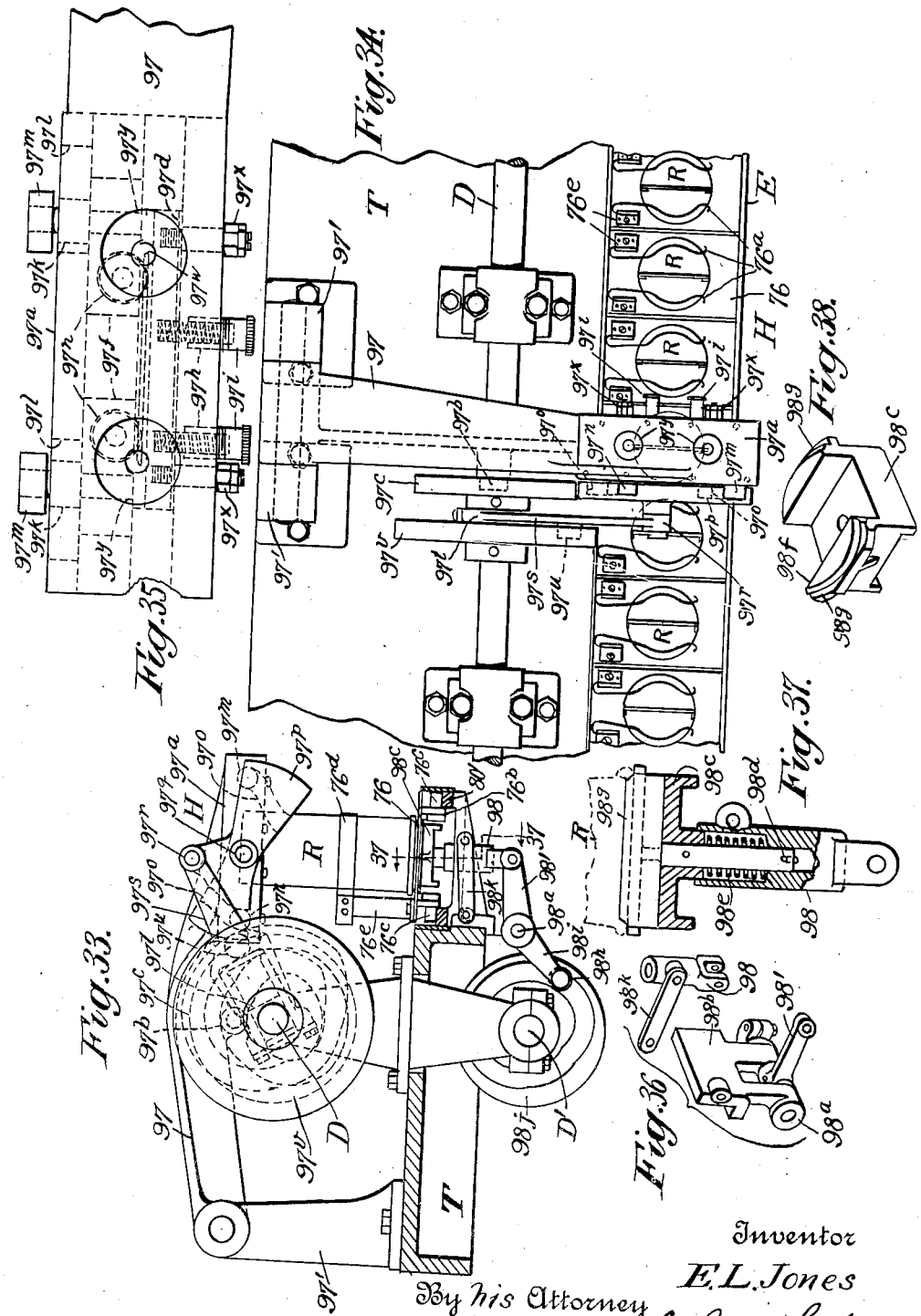

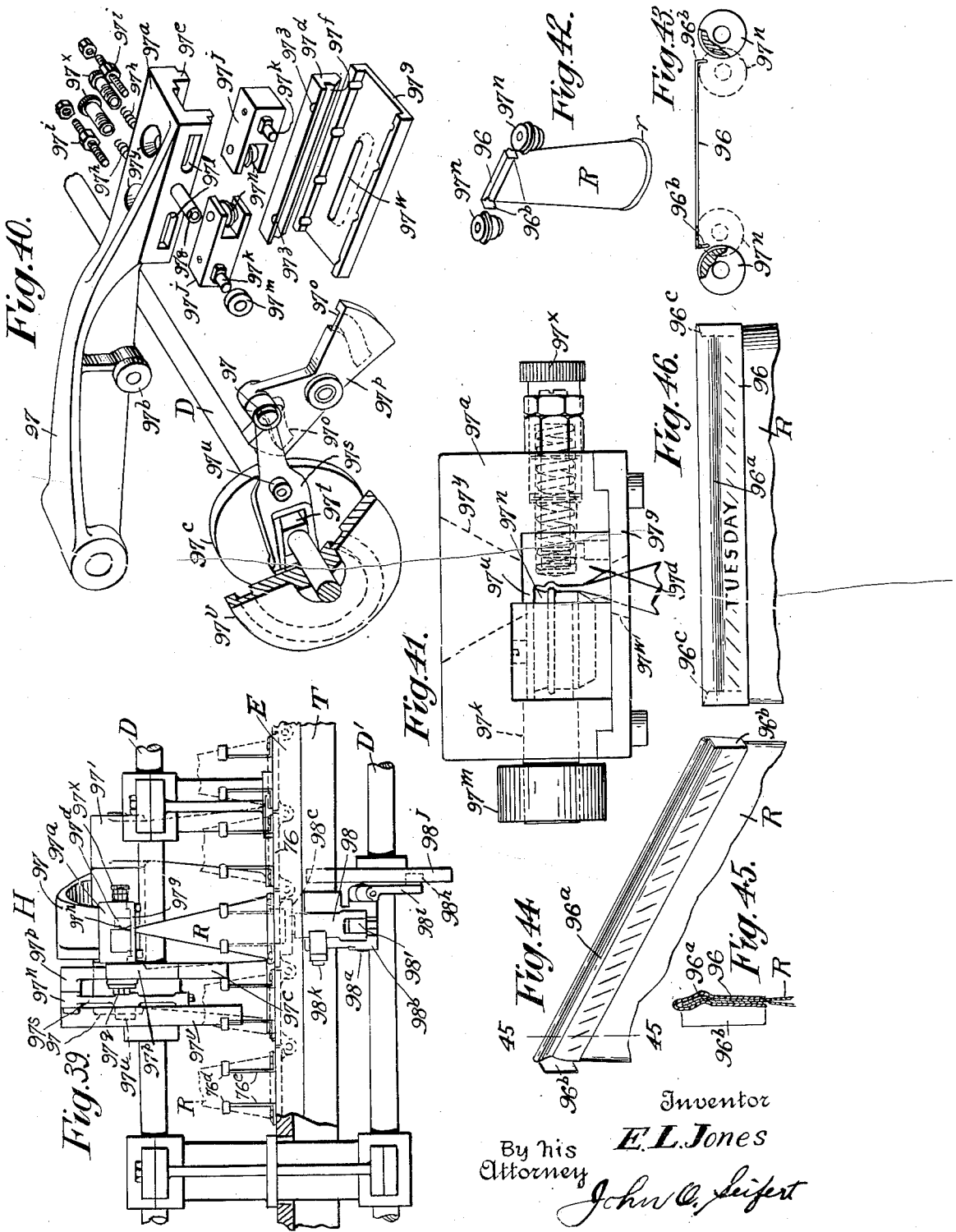

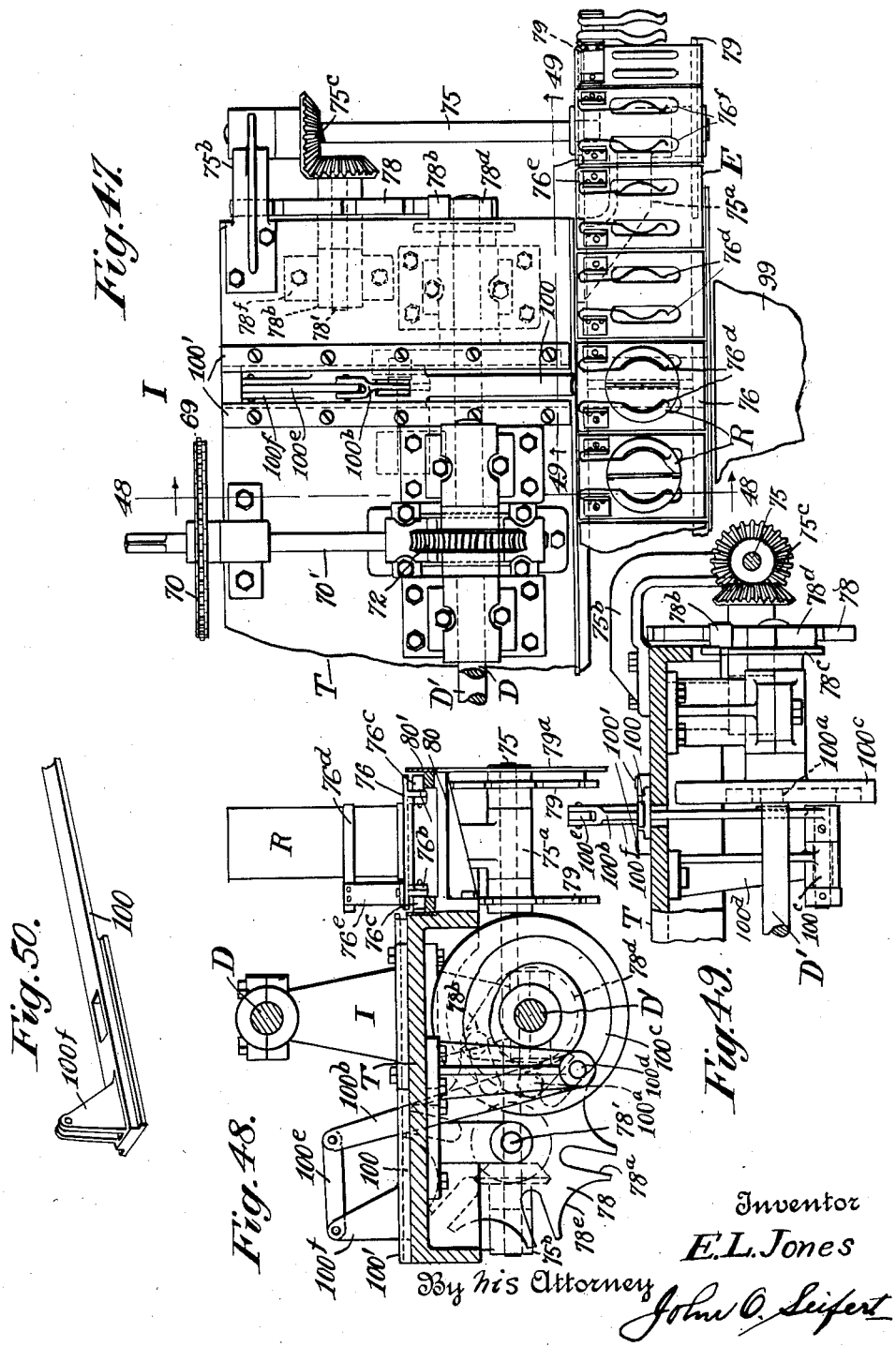

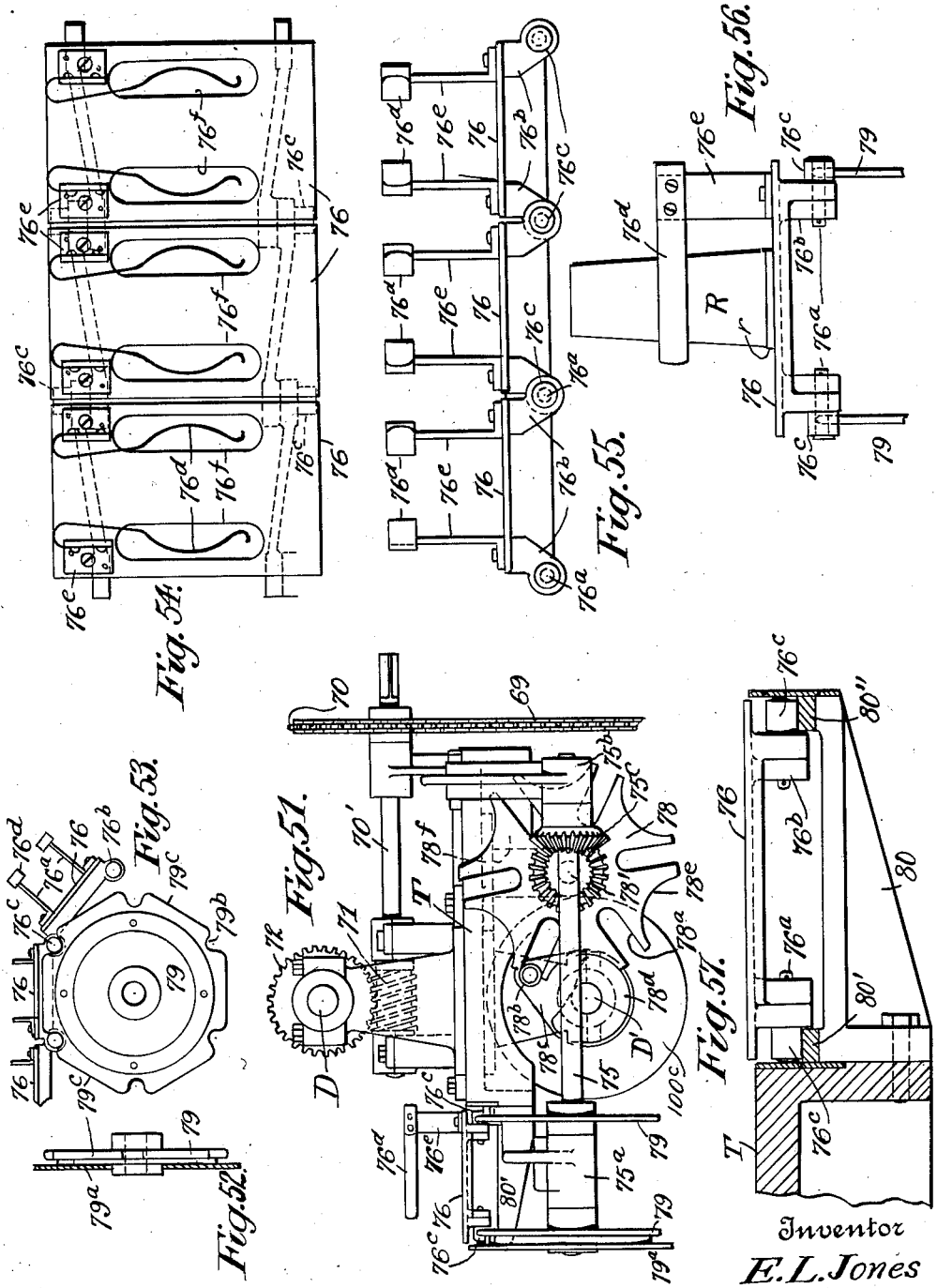

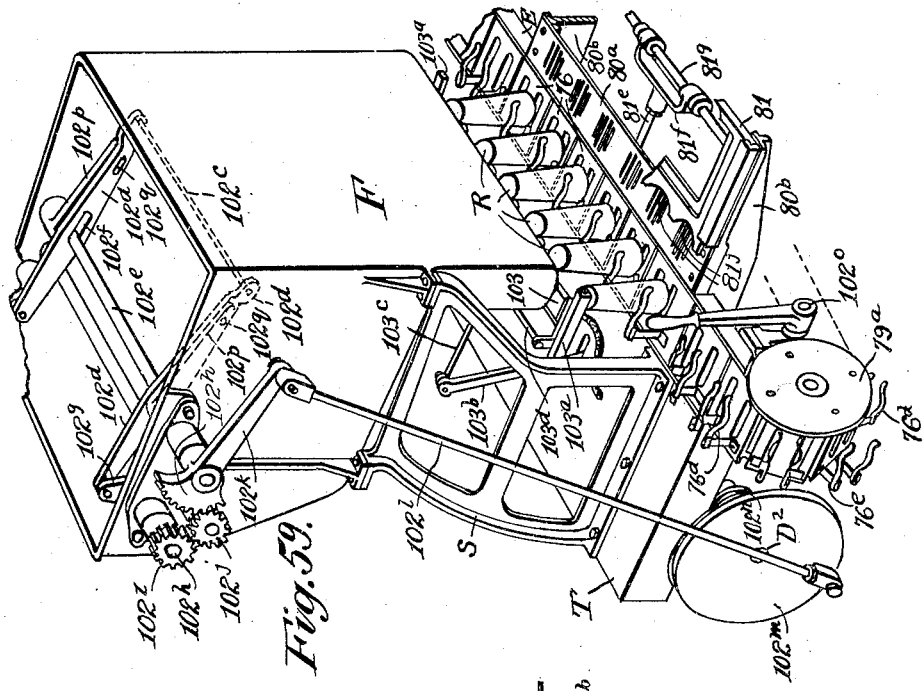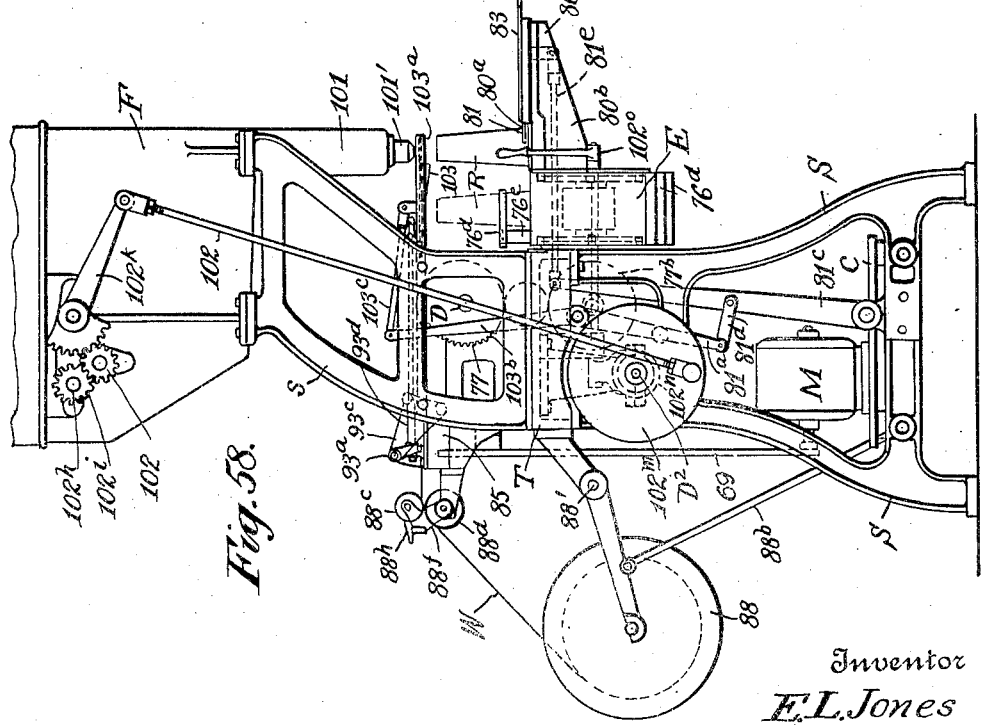

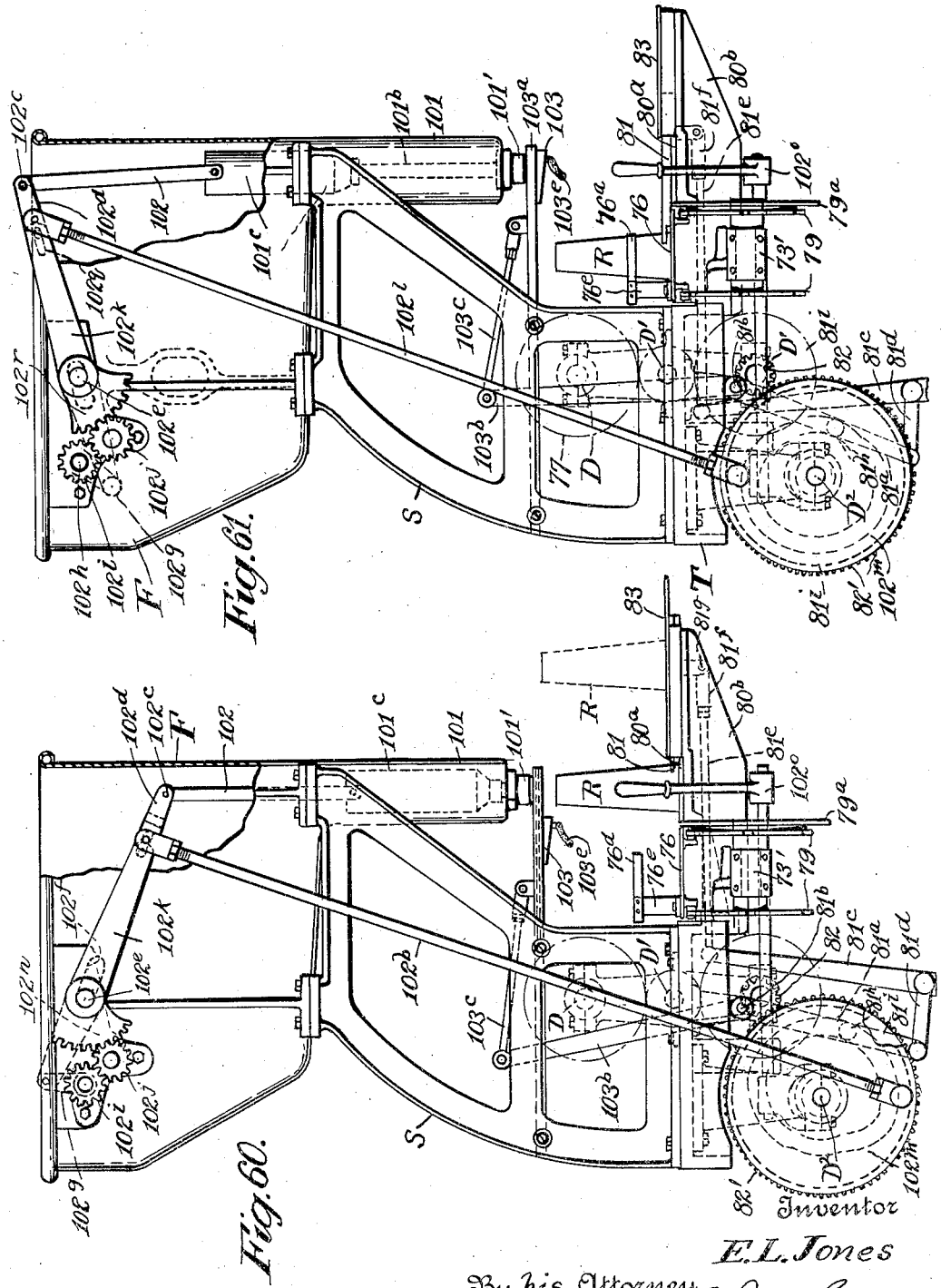

Dec. 19, 1933.  E. L. JONES  1,939,704
RECEPTACLE FILLING AND CLOSING APPARATUS AND MEANS AND METHOD OF
FORMING AND APPLYING A SEAL TO CLOSED RECEPTACLES
Filed July 19, 1930     15 Sheets-Sheet 15
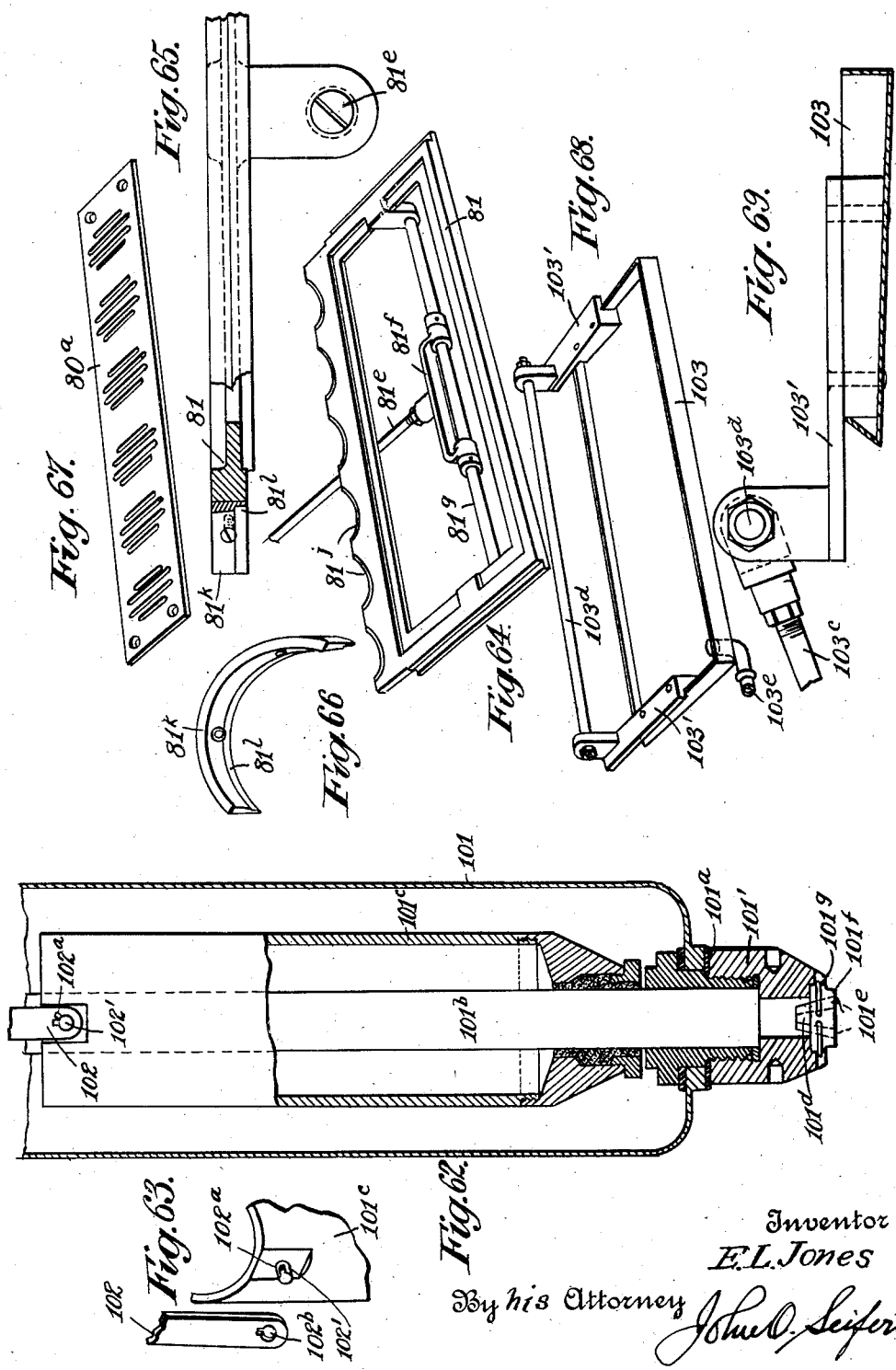

Patented Dec. 19, 1933

1,939,704

UNITED STATES PATENT OFFICE 1,939,704

RECEPTACLE FILLING AND CLOSING APPARATUS AND MEANS AND METHOD OF FORMING AND APPLYING A SEAL TO CLOSED RECEPTACLES

Ellis L. Jones, Long Island City, N. Y., assignor, by mesne assignments, to American Sealcone Corporation, New York, N. Y., a corporation of New York Application July 19, 1930. Serial No. 469,058

33 Claims. (Cl. 226—51)

This invention relates to apparatus for filling, closing and sealing receptacles or containers wherein the open end through which the contents is filled into the receptacles is collapsed to close the same by squeezing together the opposite marginal portions at the opening and then placing a closure member upon the collapsed receptacle end and sealing the closure member thereto, and it is the principal object of the invention to provide an improved closure member and method of and means for applying and sealing the closure member to the collapsed receptacle end.

It is a further object of the invention to provide an improved method of and means for successively forming a web into closure members of V shape in cross section with one of the legs of the closure member of greater length than and extending beyond the opposite ends of the other leg of said member, and delivering the formed portion of the web over a collapsed receptacle end stationed at the receptacle closing and closure member applying means for action thereon by the closure member applying part of said means to seal the closure member thereto with the extended ends of the one leg of the closure member projecting beyond the opposite sides of the collapsed receptacle end, and then subjecting the receptacle with the closure member so applied to means to fold the extended leg ends about the sides of the receptacle to embrace the opposite leg of the closure member.

Further objects of the invention relate to an improved constructed and arranged conveyor for transporting filled receptacles from the filling means to the receptacle collapsing and closure applying means, to means to positively grip a receptacle on the conveyor stationed relative to the collapsing and closure applying means to present the same to said means and return it to the conveyor, and to means for actuating the conveyor and transferring the receptacles from the filling means to the conveyor.

Other objects and advantages will hereinafter appear.

In the drawings accompanying and forming a part of this application Figure 1 is a front elevation of apparatus for filling and applying a closure member to closed receptacles and embodying the present invention.

Figure 2 is a plan view of the apparatus.

Figure 3 is a perspective view of the driving train for the operative parts.

Figure 4 is a sectional view taken on the line 4—4 of Figure 1 looking in the direction of the arrows and showing the closure member forming web feeding and forming means, the closure member applying means, and the means to present a receptacle from a conveyor to said latter means and return it to the conveyor.

Figure 5 is a side elevation to show the connection of the operative means of a part of the feeding means of the closure member forming web.

Figures 6 and 7 are side elevations of means for actuating a punch of punch and die mechanism for recessing the marginal portion of the closure member forming web in the forming of the closure member.

Figure 8 is a sectional view taken on the line 8—8 of Figure 1 looking in the direction of the arrows and looking at the side of the closure member forming web feeding and forming means and closure member applying means opposite to that shown in Figure 4.

Figure 9 is a detail view in side elevation of means to control the actuation of the punch of the punch and die mechanism for recessing the marginal portion of the closure member forming web.

Figure 10 is a perspective view, partly broken away, of a part of the feeding means for the closure member forming web.

Figure 11 is a plan view of the parts shown in Figures 4 and 8.

Figure 12 is a perspective view, taken on the line 12—12 of Figure 1 looking in the direction of the arrows, and Figures 13, 14 and 15 are detail views, of actuating means for rendering operative and inoperative the operating means for the punch of the punch and die mechanism for recessing the marginal portion of the web during the feeding thereof.

Figure 16 is a view looking at the left of Figure 4 and showing in front elevation the receptacle collapsing and closing member applying means and the means to lift a receptacle from the container to present it to said means and then return it to the conveyor.

Figure 17 is a perspective view of the parts of the closure forming means as showing the same in disassembled relation.

Figure 18 is a side elevation of the means for positively gripping a receptacle on the conveyor preparatory to presenting it to the collapsing and closure member applying means.

Figure 19 is a perspective view of the means for positively gripping and presenting the receptacle to the collapsing and closure member applying means, and showing parts thereof in dissembled relation.

Figure 20 is a perspective view of a bracket in which the means shown in Figure 19 are slidably mounted.

Figures 21 and 22 are side and plan views respectively of the closure member forming means.

Figure 23 is a view looking at the left of Figure 21 and showing a guide for the formed portion of the closure member forming web and constituting one member of a cutter mechanism for severing the formed closure member from the web.

Figure 24 is a side elevation of a reciprocatory carrier for punch and die mechanism of the closure web forming means to feed the web and recessing the marginal portion thereof.

Figure 25 is a sectional view taken on the line 25—25 of Figure 24 looking in the direction of the arrows.

Figure 26 is a perspective view in dissassembled relation of the punch of the punch and die mechanism for recessing the marginal portion of the web.

Figure 27 is a perspective view of parts in disassembled relation of the receptacle collapsing and closure member applying means.

Figure 28 is a sectional view taken on the line 28—28 of Figure 27 looking in the direction of the arrows.

Figure 29 is a sectional view to show the mounting of a cutter in relation to a member of the closure applying means to co-operate with the guide shown in Figure 23 to sever the formed portion from the closure member forming web.

Figure 30 is a perspective view and showing diagrammatically the feeding of the closure member forming web, making an impression thereon, recessing the marginal portion, forming the web to V shape in cross section and delivering and positioning the formed portion of the web over a collapsed receptacle end stationed relative to the receptacle collapsing and closure member applying means.

Figure 31 is a view of a portion of a closure member forming web to show the manner of recessing the margin thereof.

Figure 32 is a cross sectional view, on an enlarged scale, of the receptacle collapsing and closure applying means.

Figure 32a is a perspective view of a formed closure member.

Figure 33 is a sectional view taken on the line 33—33 of Figure 1 looking in the direction of the arrows and showing in side elevation the means to fold the ends of the closure member projecting beyond the opposite sides of the receptacle about the sides of the receptacle.

Figure 34 is a plan view of the parts shown in Figure 33.

Figure 35 is a plan view, on an enlarged scale, of the means for folding the extended ends of the closure member about the sides of the receptacle.

Figure 36 is a perspective view in disassembled relation of actuating means to lift a receptacle from the conveyor and present the closure member thereon to the means for folding the ends thereof about the sides of the receptacle.

Figure 37 is a sectional view, on an enlarged scale, taken on the line 37—37 of Figure 33 looking in the direction of the arrows.

Figure 38 is a perspective view of the receptacle support of the receptacle lifting means to present it to the folding means for the ends of the closure member.

Figure 39 is a view looking at the right of Figure 33 and showing in front elevation the means for folding the ends of the closure member about the sides of the receptacle.

Figure 40 is a perspective view of the parts in disassembled relation of the means for folding the ends of the closure member about the receptacle sides.

Figure 41 is a view, on an enlarged scale, looking at the left of Figure 35 and in front elevation of the means for folding the ends of the closure member about the receptacle sides.

Figure 42 is a perspective view of a receptacle and showing in relation thereto rollers of the means to fold the ends of the closure about the receptacle sides.

Figure 43 is a plan view showing in a diagrammatic manner the action of the rollers shown in Figure 42 for folding the ends of the closure member about the receptacle sides.

Figure 44 is a perspective view of a collapsed receptacle end and showing a closure member applied thereto by the closure applying means at the receptacle collapsing station.

Figure 45 is a sectional view taken on the line 45—45 of Figure 44 looking in the direction of the arrows.

Figure 46 is a view looking at the right of Figure 44 and showing in dotted lines the ends of the closure member folded about the receptacle sides.

Figure 47 is a plan view of the right hand end of the apparatus as viewed in Figures 1 and 2 to show the driving connection of the power means, the conveyor actuating means, and means for ejecting the receptacles from the conveyor.

Figure 48 is a sectional view taken on the line 48—48 of Figure 47 looking in the direction of the arrows to show the receptacle ejector and its actuating means, and the conveyor actuating means.

Figure 49 is a sectional view taken on the line 49—49 of Figure 47 looking in the direction of the arrows.

Figure 50 is a perspective view of the ejector.

Figure 51 is an end elevation looking at the right hand end of Figure 47.

Figure 52 is an end elevation, partly in section, of a wheel of the receptacle conveyor.

Figure 53 is a side elevation of a wheel of the receptacle conveyor and showing a portion of the conveyor in relation thereto.

Figure 54 is a plan view of a portion of the conveyor.

Figure 55 is a side elevation of a portion of the conveyor looking at the bottom of Figure 54.

Figure 56 is an end elevation of a receptacle support of the conveyor and showing a receptacle supported thereon.

Figure 57 is a sectional view to show the manner of supporting the conveyor in its travel.

Figure 58 is an end elevation of the apparatus looking at the left of Figure 1.

Figure 59 is a perspective view of the filling means in relation to the conveyor to show the transferring of receptacles from the filling means to the conveyor.

Figures 60 and 61 are end elevations of the filling means showing the same in relation to the conveyor and showing the parts in different positions.

Figure 62 is a longitudinal sectional view, on an enlarged scale, of measuring and discharge means of the filling means.

Figure 63 is a perspective view, disassembled, of the connection of a measuring device with its actuating means.

Figure 64 is a perspective view of means for transferring the receptacles from the filling means to the conveyor.

Figure 65 is an end elevation, on an enlarged scale, of the receptacle transferring means and looking at the right of Figure 64.

Figure 66 is a perspective view of a receptacle gauge of the receptacle transferring means shown in Figure 64.

Figure 67 is a perspective view of a shelf for supporting receptacles relative to the filling means.

Figure 68 is a perspective view of a pan to catch drippings from the filling means; and Figure 69 is a cross sectional view, on an enlarged scale, of the drip pan.

Figure 1:
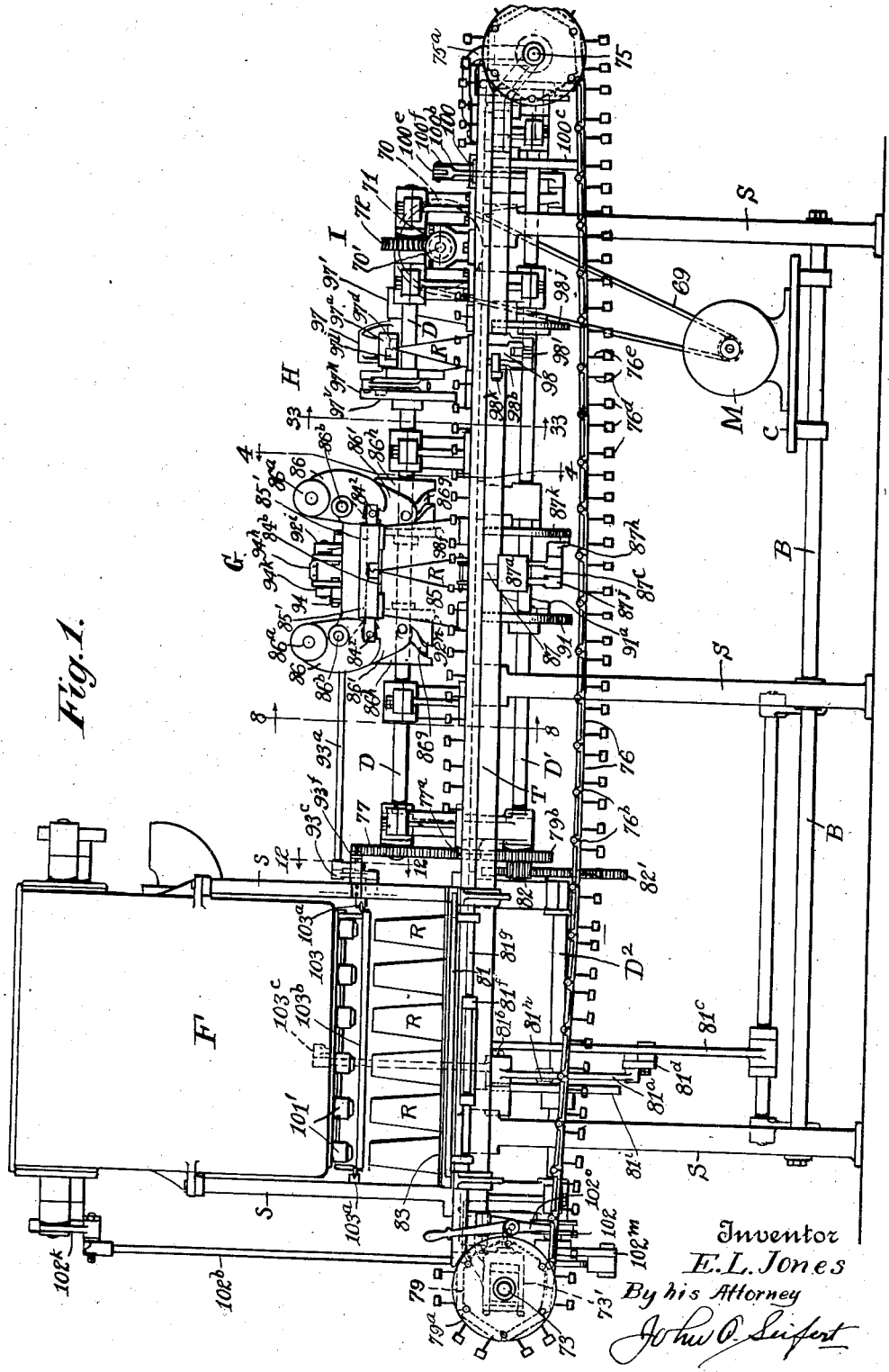

In the embodiment of the invention illustrated the operative mechanisms are mounted upon a table T supported adjacent and intermediate the ends by standards S connected by braces B, the mechanism being driven from a suitable source of power, such as an electric motor shown in a conventional manner at M, supported upon a shelf C mounted on a standard connecting brace B, the motor being operatively connected with a drive shaft D by a sprocket chain 69 passing around a sprocket wheel on the motor shaft and a sprocket wheel 70 on a shaft 70' carrying a worm 71 meshing with a worm wheel 72 fixed upon the drive shaft D.

A conveyor, indicated in a general way at E, is supported by pairs of spaced sprocket wheels, one pair of wheels being fixed to a shaft 73 journaled in a bracket 73' at one end of the table T arranged in interposed relation to the pair of wheels and the other pair of wheels fixed to a shaft 75 journaled in brackets 75$^a$, 75$^b$ (Figure 51) at the opposite end of the table. The conveyor is supported with the upper stretch to extend and travel in the plane of the top of the table and with one side of the conveyor juxtaposed to the table. The conveyor is in the nature of a chain the links of which are arranged as supports for receptacles to be transported by the conveyor, and comprise plates 76 having parallel recesses 76$^f$ therein and pivotally connected by studs 76$^a$ engaging perforations in ears 76$^b$ extended laterally from the plates at the opposite ends and adjacent opposite sides, (Figures 54 to 57,) the studs carrying rollers 76$^c$. Receptacles are releasably and yieldingly retained upon the receptacle supporting plates 76 of the conveyor by a pair of fingers 76$^d$ of resilient material fixed at one end of the ends of brackets 76$^e$ fixed upon each plate 76 adjacent one side, and to constitute the side of the conveyor adjacent the table, whereby the fingers are in spaced relation to the face of the plates, as shown in Figures 55 and 56. The fingers extend in spaced relation toward the opposite side of the plates, as shown in Figure 54, for engagement of a receptacle between a pair of fingers, the extremities of the plates being curved laterally to facilitate the engagement of the receptacle between the same, and formed to arcuate shape within the curved extremities to conform to the shape of the receptacle body.

The conveyor is intermittently actuated from a shaft D' driven from shaft D by a gear 77 meshing with a pinion 77$^a$ which meshes with a gear 77$^b$ on shaft D'. The conveyor is operatively connected with and driven from the shaft D' through a Geneva movement comprising a disk 78 fixed to a shaft 78' and having radially inwardly extending recesses 78$^a$ equidistantly spaced about the disk and adapted for the engagement of a roller, as at 78$^b$, rotatably carried by an arm 78$^c$ fixed to the shaft D', the wheel having six of the slots 78$^a$, to impart a movement to the disk through an arc of 60 degrees upon each revolution of the shaft D'. The Geneva wheel is held against rotation during the periods of rest by a circular portion of a disk 78$^d$ fixed to the shaft D', or forming a part of the arm 78$^c$, engaging a peripheral arcuate portion 78$^e$ in the Geneva wheel between the radial recesses 78$^a$. The shaft 78' carrying the Geneva wheel is rotatably carried in a bracket 78$^f$ fixed to the bottom of the table T, and the shaft is operatively connected with the conveyor wheel carrying shaft 75 by bevel gearing 75$^c$.

The conveyor supporting wheels each comprise a wheel 79 (Figures 52 and 53) having a hub portion whereby they are fixed upon the shafts 73, 75. The wheels have recesses 79$^b$ circumferentially disposed about the periphery and spaced 60 degrees apart with the portions 79$^c$ between the recesses flattened and extending in a straight plane, the recesses being adapted for the engagement of the rollers 76$^c$ on the connecting studs 76$^a$ for the receptacle supporting plates or chain links and the flattened portions to extend in parallel relation to the conveyor plates, as shown in Figure 53. A guard in the form of a disk 79$^a$ is mounted on the hub of wheels 79 at the outer side of the conveyor with an interposed spacer. The stud rollers 76$^c$ are also adapted for the supporting of the upper stretch of the conveyor during the travel thereof, for which purpose a shelf 80 (Figure 4) is fixed to and extends laterally from the table T between the stretches of the conveyor and being provided with rails 80' above and at the longitudinal marginal portions for the engagement of the stud rollers.

The conveyor is for the purpose of transporting filled receptacles from receptacle filling means to successively station the receptacles relative to means to collapse the open end to close the same and to means to apply and seal a closure member to the closed receptacle end, said latter means having associated therewith means to form closure members successively from a web and position the same upon the collapsed receptacle ends relative to the closure applying means, and then station the closed and sealed receptacles to means to eject the receptacles from the conveyor. The receptacles during the filling are supported relative to the filling means (designated in a general way by F) upon a perforated shelf 80$^a$ (Figure 67) mounted on brackets 80$^b$ fixed to and extended laterally from the table with the shelf extending in the plane of the upper surface of the receptacle supporting plates of the upper stretch of the conveyor (Figures 58 to 61) and are transferred from said shelf to the conveyor by a frame 81 slidably mounted at the ends in the brackets 80$^b$ extended beyond the shelf 80$^a$ to have reciprocatory movement over the shelf toward and away from the conveyor. The transferring frame is operatively connected with and actuated from one arm 81$^a$ of a lever pivotally supported at 81$^b$ through a lever 81$^c$ having a link connection 81$^d$ with lever arm 81$^a$ and connected with the frame 81 by a rod 81$^e$ connected with a yoke member 81ᶠ pivotally mounted on a rod 81ᵍ (Figure 64) fixed at the ends in ears extended downward from the transfer frame. The lever arm 81ᵃ is oscillated by a roller 81ʰ engaging a cam groove in a disk 81ⁱ fixed to the shaft D² journalled in hangers fixed to the bottom of the table T (Figure 1) and rotated from shaft D' by a pinion 82 on said latter shaft meshing with a gear 82' on shaft D². The transfer frame is arranged below a table 83 mounted upon the brackets 80ᵇ for the storing of receptacle and facilitating the placing of receptacles on the shelf 80ᵃ relative to the filling means by the operator. The frame 81 has arcuate recesses 81ʲ in the end adjacent the shelf 80ᵃ with curved members 81ᵏ (Figure 66) secured therein and having the lower end at the inner surface recessed, as at 81ˡ, to form a seat to engage over an annular shoulder r (Figure 56) of the receptacles to hold the receptacles to the shelf 80ᵃ and the receptacle supports of the conveyor and prevent the receptacles from being tipped over as they are transferred from the shelf to the conveyor.

The receptacles transferred to the conveyor by the operation of the conveyor are successively stationed relative to the means to collapse the open end of the receptacles to close the same and apply and seal a closure member thereto, indicated at G in Figures 1 and 2. The means to collapse and apply the closure member to the collapsed receptacle ends comprises a pair of main slides 84 slidably mounted in a recess of channel shape in cross section of a part 85' of a frame 85 mounted upon the table T, said part 85' being extended forward from the frame in spaced and overhanging relation to the conveyor, and the slides being retained therein by plates 85ᵃ. The slides have jaws 84' fixed to the opposed ends, the one jaw having a longitudinal recess 84ᵃ therein and the other jaw arranged with a longitudinal rib corresponding in cross section to the recess in the other jaw. A pair of auxiliary slides 84ᵇ substantially of T shaped are slidably mounted at the reduced portions, as at 84ᶜ in Figures 27, in a recess of the securing plates 85ᵃ juxtaposed to the slides 84, one of the auxiliary slides having portions 84ᵈ projected forward from the opposite ends to serve as gauges for the receptacle. The auxiliary slides are operatively connected with the main slides 84 to participate in the movement thereof and have independent movement relative to the main slides by a block 84ᵉ fixed in the auxiliary slides engaging in elongated recesses 84ᶠ in the undersurface of the main slides and normally urged to position forward of the jaws of the main slides by springs 84ʰ in the recesses 84ᶠ confined between the end wall of the recess and the block 84ᵉ.

The slides are reciprocated toward and away from each other during the periods of rest of the conveyor by a pair of levers each embodying a pair of arms 86, 86' connected and weighted at one end 86ᵃ, the levers being pivotally supported by arms 86ᵇ extended upward and laterally from the portion 85' of the frame 85 and having a boss at the free ends to fit between and engage the lever arms, the levers being arranged with the weighted and connected ends above the pivot supports and in the normal position of the slides assuming a position directly above the axis of the lever supports and when the slides are moved toward each other are moved laterally thereof whereby the force of the weighted ends will be applied to the levers. The one arm 86 of the levers is operatively connected with the slides 84 by a block 86ᶜ loose on a pin 86ᵈ mounted in the legs of a bifurcated portion 84ⁱ at the end of the slides 84 opposite the jaws 84' with the block engaging within the bifurcation, and said block slidably engaging a bifurcation 86ᵉ in the end of the arms 86. The slides are reciprocated by rollers 86ᶠ (Figures 4 and 11) rotatably carried at the ends of the arms 86' extended beyond the arms 86 engaging a cam groove 86ᵍ in drums 86ʰ fixed on shaft D.

When a receptacle on the conveyor is stationed relative to the collapsing and closure member applying means it is lifted from the receptacle support of the conveyor and positioned between the slides and simultaneously therewith the slides are actuated to move them toward each other thereby squeezing together the opposite marginal portions of the wall at the receptacle opening. This receptacle lifting means comprises a plunger 87 (Figures 16 and 18 to 20) slidably mounted to have reciprocatory movement in and extended through a bore 87' of a portion of a bracket 87ᵃ fixed to the table T to extend laterally therefrom and below the upper stretch of the conveyor, said plunger being pivotally supported by a lever 87ᵇ fixed to a shaft 87ⁱ rotatably mounted in arms 87ʲ extended downward from the bracket 87ᵃ with the arm 87ᵇ engaged between the bracket arms 87ʲ, said arm 87ᵇ engaging a bifurcation 87ᶜ at the end of the plunger. The upper end of the plunger has a head arranged with parallelly and spaced bifurcated members 87ᵈ of rectangular shape in cross section, with fingers 87ᵉ pivotally mounted within the bifurcations of said members and extending beyond the opposite ends thereof, said fingers being adapted to support a receptacle at the bottom and having portions 87ᶠ between which the receptacle is adapted to be engaged and grip the receptacle about the marginal portions of the bottom to positively connect the receptacle with the plunger. The plunger is actuated by a roller 87ᵍ rotatably carried by an arm 87ʰ fixed to the projecting end of the shaft 87ⁱ, said roller engaging a cam groove in the face of a disk 87ᵏ fixed to the shaft D'. The fingers 87ᵉ are normally urged to receptacle gripping position by a spring 87ˡ engaging a block 87ᵐ slidably mounted in the bifurcation of the members 87ᵈ, said block having opposite recesses for the engagement of projecting portions of the fingers 87ᵉ, as shown at 87ⁿ in Figure 18. The plunger 87 is normally positioned below the upper stretch of the conveyor, and in order to spread the fingers 87ᵉ to release them from a receptacle rods 87ᵠ are fixed in the blocks 87ᵐ and extend downward into bores 87ᵒ in the portion of the bracket 87ᵃ having the plunger engaging bore 87' and at diametrically opposite sides of said bore. The lower ends of the bores 87ᵒ are closed by abutments in the form of screws 87ᵖ (Figure 19) for engagement of the ends of the rods 87ᵠ, with springs 87ʳ interposed between the abutments and reduced ends of the rods. In the normal lower position of the plunger 87 the ends of rods 87ᵠ will engage the abutments 87ᵖ with the blocks 87ᵐ moved upward and the fingers 87ᵉ laterally. The portions 87ᵈ of the plunger head are adapted to be extended through the openings 76ᶠ (Figure 54) in the receptacle supports of the conveyor, and the portions of the fingers 87ᵉ within the parts 87ᶠ with the bottom of the receptacle at which time the plunger will have moved sufficiently to move the rods 87ᵠ out of engagement with abutments 87ᵖ and permit of movement of the blocks 87ᵐ by the springs 87ʳ to effect movement of the fingers to grip the receptacle about the margin of the bottom and the fingers are retained in such position until the receptacle is again seated upon the conveyor receptacle support during the retrograde movement of the plunger.

As the receptacle is lifted from the conveyor the slides 84 are moved toward each other and the auxiliary slides 84ᵇ into engagement with opposite wall portions of the receptacle at the open end and squeezing together said opposite wall portions and positioning the collapsed end between the jaws 84' of the slides 84 with the gauge members 84ᵈ of the collapsing slides engaging at the opposite sides of the collapsed receptacle end. With the receptacle in this position means are actuated for feeding a metallic strip or web W and form successive portions thereof into closure members, a previously formed portion, and constituting a closure member, being positioned on or above the collapsed receptacle end in relation to the closure member applying slides 84 which are then actuated, cutter mechanism during the initial movement of said slides being operated to sever said portion of the formed web positioned relative to the closure member applying slides.

The closure member forming web W is in the form of a roll 88 (Figure 8) carried by a reel rotatably supported in arms pivotally carried by a bracket fixed to and extending laterally from the table, as at 88', and supported by a brace 88ᵇ. The web is delivered from the reel between a pair of wheels 88ᶜ, 88ᵈ, the wheel 88ᵈ being peripherally flanged at the opposite ends and rotatably supported in a bracket 88ᵉ fixed to and extending laterally from the frame 85. The other wheel 88ᶜ embodies a pair of spaced disk-like members having an integral hub, as shown in Figure 10, and of a width to engage with the periphery of the other wheel between the flanges thereof, the periphery of the disks of wheel 88ᶜ being transversely corrugated to provide a roughened surface and facilitate the feeding of the web, and the periphery of one disk is arranged with impression making devices or symbols adapted to be impressed into the material of the web, such as the name of a day (Figure 46) upon which the closure member was applied to a receptacle. The wheel 88ᶜ is loosely and rotatably mounted on an intermediate eccentric portion of a stud shaft 88ᵏ having the ends reduced whereby it is rotatably mounted in the legs of a bifurcated bracket 88ᶠ mounted on bracket 88ᵉ. The wheel carrying shaft is adapted to be rotated to adjust the wheel in a direction toward and forcibly engage it with the wheel 88ᵈ by fixing one end of the shaft, as at 88ᵍ, in a lever 88ʰ having an arcuate recess 88ⁱ whereby it is mounted on a stud 88ʲ fixed in and extended laterally from the bracket 88ᶠ and secured in adjusted position by a nut threaded onto the stud 88ʲ with an interposed washer. Rotation of the shaft 88ᵏ is effected by moving the lever 88ʰ relative to the stud 88ʲ. The web is delivered from the wheel 88ᶜ and 88ᵈ to punch and die mechanism carried by a carriage or carrier (indicated in a general way at the position G in Figures 4 and 8). A die 89 (Figures 24, 25 and 26) is carried in a recess in a block 90 (Figure 17) of the carrier in interposed relation to said block and a block 90' superposed thereto having guide openings in register with the openings in the die, as at 90ᵃ and 90ᵇ, for engagement of punches 89ᵃ and 89ᵇ carried by a head 89ᶜ. The punches cooperate with the die openings to recess the marginal portion of the web, the punches and co-operating openings in the die and guide openings in the block 90' having a cross sectional shape to form recesses in the margins of the web, as shown at 89ᵈ and 89ᵉ in Figure 31. The punch head is slidably mounted in a recess 90ᶜ of the block 90' and connected in said block recess with a head 89ᵍ of a plunger 89ᶠ by headed screws extended through openings in the plunger head and threaded into the punch head, the punch being slidably mounted in a cap 90ᵈ fixed to and bridging the recess in block 90'. The carrier block 90 slidably engages slide ways 85ᵇ of the frame 85 to have reciprocatory movement in a direction toward and away from the receptacle collapsing and closure member applying slides carried by the part 85' of said bracket, and retained in the slideways by gibs 85ᶜ secured upon the wall of the slideways to overhang the carrier block 90'. The underface of the carrier block 90' juxtaposed to the die 89 is arranged with a recess for the passage and guiding of the web, as shown at 90ᵉ in Figures 24 and 25.

The carrier is reciprocated from the shaft D' by a roller 91' carried by one arm of a lever 91ᵃ engaging a cam groove in a disk 91, the lever being pivotally supported at 91ᵇ between a pair of ears extended downward from the bracket 85 through an opening in the table T. The carrier is connected with the other arm of said lever by a link 91ᶜ (Figure 5) pivotally connected at one end to ears extended from the bottom of carrier block 90° as shown at 91ᵈ. The other end of the link has a pivot connection 91ᵉ with a stud 91ᶠ having an adjustable connection with the lever 91ᵃ by screw threading into a longitudinally split sleeve 91ᵍ engaged upon and releasably clamped to the end of the lever by a screw 91ʰ. By the adjustment of the stud 91ᶠ relative to the lever adjustment is effected in the travel of the carrier and variations in the length of web fed. The punch carrying plunger 89ᶠ is extended through and slidable in an opening in the cap member 90ᵈ with the end engaging a bifurcation at the end of and pivotally connected to an arm 89ʰ secured on a shaft 89ⁱ between bosses of a pair of arms 90ᶠ extended upward from the cap 90ᵈ and in which bosses the shaft is rotatably mounted.

The punch is actuated to recess the web at the termination of the retrograde movement of the punch and die carrier and retained in engagement with a recess of the web during the advancing movement of the carrier and positively feed the web therewith, and at the termination of the advancing movement of the carrier the punch is withdrawn from the web recess and retained in such position during the retrograde movement of the carrier. The punch actuating means comprises a pair of slides 92, 92' slidably mounted in a slideway 85ᵈ in the outer side of one wall of the slideway 85ᵈ for the punch and die carrier in the frame 85 (Figure 17) and retained therein by a removable cap plate 85ᵉ. The slide 92 is arranged at the inner side and carries a laterally extending lug 92ᵃ to slidably engage an elongated recess 92ᵇ in and extending beyond the outer side of the other slide. The slides are of a length to extend beyond the ends of the slideway and are releasably coupled together by a cam member 92ᶜ (Figure 4) pivotally mounted on a pivot support on the slide 92 at the inner end of and in line with the recess 92ᵇ and adapted to have movement between and be positioned relative to the slide lug 92ᵃ and a pin 92ᵈ fixed in and extending laterally from the slide. The slides are operatively connected and actuated from the drive shaft D by a roller 92ᵉ rotatably carried by the inner downwardly extended end of the slide 92 engaging a cam groove in a disk 92ᶠ fixed on the shaft D. The punch is actuated from the slide 92' by either one of a pair of ears 92ᵍ, 92ʰ engaging a roller carried by an arm 92ⁱ fixed to the shaft 89ˡ upon which the punch carrying arm 89ʰ is fixed and extending downward therefrom with the roller carrying end positioned between the slide ears. As the carrier comes to rest at the termination of its advancing movement, as shown in Figure 4, the roller engages the slide ear 92ᵍ, the slide 92' being actuated to the right from the movement of the slide 92 imparted thereto by the cam disk 92ᶠ by the abutment 92ᵃ engaging the rear wall of the slot 92ᵇ and rocking the arm 92ⁱ, and thereby moving the arm 89ʰ upward and withdrawing the connected punch from the web recess. The punch is retained in such position during the retrograde movement of the carrier and at the termination of such movement the roller carried by arm 92ⁱ is brought into abutting relation with the slide ear 92ʰ and as the slides are actuated to the left the abutment 92ᵃ engaging the cam 92ᶜ couples the slide 92' with slide 92 and the arm ear moving the punch actuator arm 92ⁱ to the left and the punch downward to web recessing position. The cam 92ᶜ is for the purpose of rendering the web feeding means operative and inoperative to feed the web during the reciprocatory movement of the carrier. In the operative position thereof it is as shown in Figures 4 and 6, and to render it inoperative, which may be desirable without stopping the operation of the apparatus, the cam 92ᶜ is adjusted to the position shown in Figure 7 into engagement with the abutment pin 92ᵈ. To effect adjustment of the cam 92ᶜ by the operator positioning receptacles on the shelf 80ᵃ gauged relative to the members 81ᵏ of the transfer frame 81 and the filling means, it is connected by a link 93 with an arm 93' fixed to a rock shaft 93ᵃ rotatably supported in a bracket 93ᵇ fixed upon the frame 85 (Figures 9 and 11 to 15) and at the opposite end in a bracket 93ᶜ fixed to one of a pair of standards s mounted on the table T and supporting a liquid carrying tank of the filling means. The shaft is rocked by a rod 93ᵈ connected at one end to an arm 93ᵉ, the rod being extended transversely of the apparatus to the front side thereof and having the opposite end flattened and extended through a transverse elongated perforation in a bracket 93ᵍ fixed to standard s, movement of the rod being limited by pins 93ʰ extended laterally therefrom at opposite sides of the bracket 93ᵍ and retained in either of its adjusted positions by engaging the lower wall of the perforation 93ᶠ in bracket 93ᵍ in either one of a pair of recesses 93ⁱ in the rod. Should the cam operating rod 93ᵈ be actuated during the operation of the slides 92, 92', or with the slide lug 92ᵃ at the inner end of the slide recess 93ᵇ, it will be evident that the adjustment of the cam 92ᶜ cannot be effected, and for this purpose a lost motion connection is provided between the rod 93ᵈ and the rocker arm 93ᵉ to compensate for the adjustment of the rod and also being adapted to actuate the arm when the slide abutment 92ᵃ is in position to permit of adjustment of the cam 92ᶜ into operative relation thereto. This connection comprises a perforated split block 93ʲ pivotally supported in the arm 93ᵉ for the adjustable mounting of a tube 93ᵏ (Figures 12 and 15) and into which the rod 93ᵈ is extended and engages in sleeves 93ˡ in the tube, which sleeves are retained in the tube by rings 93ᵐ secured in the opposite ends of the tube with a spring 93ⁿ interposed between the sleeves, the rod 93ᵈ being connected with the sleeve at the outer end by the head of a screw 93ᵒ threaded into the end of the rod overhanging the sleeve and whereby the rod is normally urged in a direction into the tube by the spring.

Upon the successive feeding movement of the web the recessed portion is delivered relative to means to form the web between adjacent recesses to inverted V-shape in cross section to constitute a receptacle closure member. This means (Figures 1, 2, 4, 8, 11, 16, 17, 21 and 33) comprises an auxiliary bracket 94' embodying a plate portion having a pair of arms 94 extended upward from the opposite marginal portions and intermediate the ends with a recessed portion 94ᵃ intermediate the arms and mounted at one end upon lugs 85ᵍ of the frame 85 to extend forwardly of the slideway 85ᵇ of said bracket toward the shelf 85' with the recess 94ᵃ in line with the web guiding recess 90ᵉ in the underface of the slideway 90' of the punch and die carrier. A die member embodying a plate 94ᵇ is mounted in the bracket recess 94ᵃ, the plate having a rib 94ᶜ extended from the top face and extending longitudinally of the plate midway of the sides, the rib being progressively shaped from the rear end to intermediate the length of the plate to V shape in cross section and of such shape to the forward end. A die member 94ᵈ is mounted between the bracket arms 94' to have movement toward and away from the die plate 94ᵇ and has a longitudinal recess 94ᵉ in the face opposite to the die plate corresponding to the shape of the rib 94ᶜ. This die member is pivotally supported intermediate its ends by links 94ᶠ engaged upon the ends of a pin 94ⁱ fixed in and extending from the opposite sides of said die member, the extended ends of said pin engaging and being guided in recesses 94ᵍ in the bracket arms. The links are pivotally connected to an arm 94ʰ fixed upon a shaft 94ʲ between the bracket arms and the shaft is rotatably supported in perforations in said arms, the arm 94ʰ with the links forming in effect a toggle link connection between the die member 94ᵈ and the shaft 94ʲ. The shaft is operatively connected and rocked from the shaft D to move the die member 94ᵈ toward and away from the die plate 94ᵇ by an arm 94ᵏ (Figures 21 and 22) fixed to the end of the shaft 94ʲ extended beyond a frame arm 94' and having a link connection 94ᵒ with a lever 94ˡ pivotally supported upon the side of the bracket 85 and operatively connected with the shaft D by a roller 94ᵐ engaging a cam groove in a disk 94ⁿ, the cam groove being arranged to actuate the die member 94ᵈ during the periods of rest of the punch and die carrier. Upon the successive movement of the web the formed portion thereof is delivered from the forming dies to a guide member (Figures 2, 4, 11, 17, 21, 22 and 23) comprising a block 95 having a rib 95' of inverted V shape and corresponding in cross sectional shape to the formed web, and a block 95ᵃ being superposed to the block 95 and having a longitudinal recess 95ᵇ in the opposed face corresponding to the rib 95' but of slightly greater area to provide a space between the wall of the recess and the rib for the passage of the formed web. This guide member is secured in the recess 94ª of the bracket 94 to extend forward of the bracket by screws passed through openings in the guide blocks and threaded into said bracket. The formed web is delivered beyond said guide block to an extent to constitute the length of a closure member 96, as shown in Figure 32ª, with the forward end of the guide members extending in a plane midway between the ends of a recess in the web, and said end of the guide member serving as a cutter member with which a cutter 95ᶜ co-operates to sever the web, said cutter (Figures 23, 27, 28 and 29) being mounted in a recess in a split portion at the inner side of one of the closure member applying slides 84, as shown at 95ᵈ in Figure 29, and projecting beyond the clamping jaw 84'. By the severing of the web midway the ends of a recess portion there is provided a closure member of V shape in cross section one of the legs of which is of greater length than the other leg with the ends thereof projecting beyond the ends of the other leg. Previous to the delivery of the formed web to the guide member the collapsing slides 84ᵇ have collapsed a receptacle end positioned between the collapsing and closure member applying slides and the fed web is delivered over and upon the collapsed receptacle end between the clamping jaws of the closure member applying slides 84 with the ends of the longer leg extending beyond the opposite sides of the collapsed receptacle end, the intermediate portion of the closure member being of a length equal to the width of the collapsed receptacle end. The web is severed during the initial movement of the closure member applying movement of the closure member applying slides and in succession the closure member on the receptacle is engaged by the clamping jaws above the collapsing slides 84ᵇ, and the jaws by the arranging of a longitudinal recess in one jaw and a rib on the other jaw longitudinally fluting the closure member and interlocking the material thereof with the material of the interposed receptacle and sealing the closure member to the receptacle, as shown at 96ª in Figures 44 to 46. Simultaneously with the sealing of the closure member to the receptacle the extended ends of the longer leg of the closure member are folded to extend at right angles to the body of the closure member and relative to the opposite sides of the collapsed receptacle end, as shown at 96ᵇ in Figures 42 to 45, by the cutter 95ᶜ and a plate 95ᵉ secured in a recess in the side of the slide 84 opposite to the cutter with the end projecting beyond the jaw of said slide.

After the closure member has been applied to the collapsed receptacle end, as described and as shown in Figure 44, receding movement is imparted to the collapsing and closure member applying means and the mechanism for lifting the receptacle from the conveyor to present it to such means is actuated to reposition the receptacle upon the receptacle seat of the conveyor to be further transported thereby and stationed the same (indicated at H in Figures 1 and 2) relative to means for folding the closure ends 96ᵇ to embrace the opposite closure leg. This means (Figures 1, 2 and 33 to 43) comprises a lever 97 pivotally supported at one end by a bracket 97' fixed upon and at the rear of the table T with the lever extending transversely of the table and arranged with a head 97ª at the free end having a longitudinal channel in the bottom extending above and transversely of the conveyor. The head end of the lever has a limited movement imparted thereto in a direction toward and away from the receptacle transporting conveyor by a roller 97ᵇ rotatably mounted on a stud fixed in and extending laterally from the side and intermediate the ends of the lever engaging a cam groove in a disk 97ᶜ on the shaft D. The means to fold the ends of the closure member comprises a bar 97ᵈ (Figure 40) mounted in the channel of the lever head 97ª adjacent to a side channel wall 97ᵉ, said bar having one face 97ᶠ shaped to conform to the shape of the fluted closure member on the receptacle and substantially of the form of the recessed jaw 84' fixed to one of the closure member applying slides 84. The bar is supported in the head channel by a cap plate 97ᵍ secured to the channel legs, as shown in Figure 41, and held against longitudinal movement while permitting of a limited lateral movement thereof by headed screws 97ˣ passed through openings in the channel wall 97ᵉ and threaded into the bar, the bar being urged in a direction away from the channel wall by springs 97ʰ seated in sockets in the bar and registering perforations in the channel wall 97ᵉ and retained therein by screw plugs 97ⁱ threaded into the outer end of the channel wall perforations. A pair of blocks 97ʲ are slidably mounted in the head channel in opposed relation to the bar 97ᵈ with studs 97ᵏ fixed in the blocks extended through and flattened portions thereof engaging elongated perforations 97ˡ in the other channel wall with rollers 97ᵐ rotatably supported on the extended stud ends. Rollers 97ⁿ are supported in bifurcations in the opposed ends of the blocks 97ʲ with a peripheral portion projecting from the inner face of the block in opposed relation and shaped to conform to the face 97ᶠ of the bar. The rollers 97ᵐ engage in cam grooves 97ᵒ in the opposite ends of a plate 97ᵖ pivotally supported intermediate the ends on a stud 97ᑫ fixed in and extended from the lever head intermediate the slots 97ˡ. The cam plate has a pivotal connection 97ʳ with one end of an actuator 97ˢ the opposite end of which actuator is bifurcated and slidably engages a squared block on the shaft D, as at 97ᵗ in Figure 40. The actuator is longitudinally reciprocated by a roller 97ᵘ rotatably carried thereby engaging a cam groove in a disk 97ᵛ fixed on shaft D. The cam groove in disk 97ᵛ is arranged to normally position the cam plate actuator and the cam plate to adjust the roller carrying blocks 97ʲ with the rollers 97ⁿ at the opposite ends of a slot 97ʷ in the cap closure plate 97ᵍ, as shown diagrammatically in full lines in Figure 43. In this position of the rollers the receptacle end with the closure member thereon having the ends extended at a right angle to the body, as shown in Figure 44, is entered through said slot relative to the bar 97ᵈ and interposed between the rollers 97ⁿ. The wall of the recess 97ʷ diverges outwardly, as shown in dotted lines in Figure 40, and as the receptacle end is inserted therein the extended closure ends 96ᵇ are directed toward the receptacle. As the closure member abuts an overhang of the bar 97ᵈ, as shown at 97ᵘ in Figure 41, the cam plate 97ᵖ is actuated to move the roller carrying blocks toward each other, as shown diagrammatically in dotted lines in Figure 43, and the rollers 97ⁿ effecting a clamping of the extended closure ends against the closure member and simultaneously longitudinally fluting said ends to correspond with the fluting of the closure member effected by the jaws of the closure applying slides 84.

The receptacle is lifted from the conveyor and positioned relative to the lever head 97ᵃ simultaneously with the movement of the lever head in a direction toward the conveyor by a plunger 98 (Figures 33 and 36 to 38) pivotally carried by an arm 98' fixed to a shaft 98ᵃ in a bifurcation of a bracket 98ᵇ fixed to the table T. A head 98ᶜ is fixed to a stem whereby it is slidably mounted in the plunger to have a limited movement relative to the plunger by a pin and slot connection 98ᵈ and urged outward from the plunger by a spring 98ᵉ. The head has opposite parallel spaced portions 98ᵍ adapted to pass through the parallel perforations 76ᶠ in the receptacle supports 76 of the conveyor, the outer side of which portions is of arcuate form with the outer end reduced and forming a seat 98ᶠ for engagement and support of the receptacle and the reduced portion engaging within a flanged portion of the receptacle bottom and preventing lateral displacement of the receptacle relative to the head. The arm carrying shaft 98ᵃ is rocked and thereby the receptacle carrying plunger vertically reciprocated by a roller 98ʰ carried by an arm 98ⁱ fixed to the extended end of shaft 98ᵃ engaging a cam groove in a disk 98ʲ fixed on the shaft D', the cam groove being arranged to actuate the receptacle lifting plunger to position the receptacle relative to the lever head 97ᵃ and retain it in such position during the action of the parts carried by said head on the closure member, and then reposition the receptacle on the receptacle support of the conveyor. The plunger is guided and maintained in substantially vertical position by a link 98ᵏ connected at one end with the plunger and at the opposite end to the bracket 98ᵇ. To view the operation of the folding and clamping rollers 97ⁿ and ascertain whether or not they are properly functioning sight openings 97ʸ (Figures 2, 3, 4, 35 and 40) are extended through the connecting wall of the channel head 97ᵃ of the lever, said openings being positioned in line with the ends of the slots 97ʷ in cap plate 97ᵍ and in register with recesses 97ᶻ in the bar 97ᵈ. The wall of the openings converge from the outer side of the head to the inner channel wall to facilitate observing the action of the folding and clamping wheels 97ⁿ.

The receptacles are transported from station H to means to transfer or eject the closed and sealed receptacles from the conveyor, (indicated at I in Figures 1, 2 and 3,) the receptacle being ejected to a table, or to another conveyor, indicated in a conventional manner at 99 in Figure 2. The receptacle ejecting means (Figures 1, 2 and 47 to 50) comprises a slide 100 slidably mounted upon and to have movement transversely of the table T by gib plates 100' with the free end of the ejector juxtaposed to the inner side of the conveyor and in line with a receptacle between the receptacle holding fingers 76ᵈ of a conveyor receptacle support. The ejector slide is reciprocated during the periods of rest of the conveyor by a roller 100ᵃ carried by a lever 100ᵇ engaging a cam groove in a disk 100ᶜ fixed to shaft D'. The lever is pivotally supported at one end by a hanger 100ᵈ fixed to and extending from the bottom of the table and connected with the ejector at the other end by a link 100ᵉ between a pair of ears 100ᶠ extended upward from the ejector slide.

The receptacle filling means is arranged at the left hand end of the apparatus as viewed in Figures 1 and 2, and comprises (Figures 58 to 69) a liquid carrying tank F supported by the standards s in superposed and spaced relation to the table T with a portion 101 extending below the bottom of the tank in line with the shelf 80ᵃ and has a series of outlet nozzles 101' connected to flanged sleeves 101ᵃ extended through openings 80 in the bottom of portion 101 and co-operating therewith to clamp the nozzles to the tank, the sleeves carrying tubes 101ᵇ extended up into the tank upon which are slidably mounted measuring devices in the form of dippers 101ᶜ to deliver the contents from the tank through the tubes in predetermined measured quantities. The discharge means of the nozzles comprises conical members 101ᵈ having a series of longitudinal slots 101ᵉ of angular shape in cross section circumferentially disposed about the periphery, said members being secured in rings 101ᶠ and whereby the nozzle members are mounted axially in an enlarged portion at the ends of the bores in the nozzles and retained therein by split rings 101ᵍ engaged in an annular reduced portion of the rings and a further enlarged portion of the nozzle bores.

The measuring devices or dippers 101ᶜ are supported by links 102 releasably connected with studs 102' extended laterally from diametrically opposite sides of the dippers and having lugs 102ᵃ at the outer ends extending laterally therefrom at an angle to the axes of the dippers, the links having a perforation with a lateral enlargement 102ᵇ for engagement of the dipper studs and engaged thereon by positioning the link perforation to register with the stud lugs and then rotating the links to extend longitudinally of the dippers. The links are pivotally mounted on a rod 102ᶜ fixed at the ends in a pair of arms 102ᵈ supported to have rocking and longitudinal movement on a rotatable shaft 102ᵉ engaging slots 102ᶠ intermediate the ends of the arms, the opposite ends of the arms being pivotally connected to crank arms 102ᵍ fixed to shafts 102ʰ rotatably mounted in bearings fixed in and extending through side walls of the liquid carrying tank. Pinions 102ⁱ fixed on the outer ends of said shafts mesh with pinions 102ʲ rotatably mounted on studs fixed in the tank wall, which pinions mesh with toothed sectors 102ʳ fixed to the projecting ends of the shaft 102ᵉ, the one sector being arranged at one end of a lever 102ᵏ. The lever 102ᵏ is oscillated to rock the connected crank arms 102ᵍ and thereby impart longitudinal movement to the dipper carrying arms 102ᵈ by a rod 102ˡ pivotally connected at one end with lever 102ᵏ and at the opposite end to a pin fixed in a disk 102ᵐ eccentric to the axis thereof loosely mounted on shaft D², the disk being releasably coupled with the shaft by a clutch 102ⁿ (Figure 3) operative by a shifter 102ᵒ. To rock the arms 102ᵈ simultaneously with the longitudinal movement thereof they are connected with rock shaft 102ᵉ to participate in the movement thereof by arms 102ᵖ fixed to said shaft and having a pin and slot connection 102ᑫ with arms 102ᵈ. By this arrangement the force exerted on the dippers to move them along the discharge tubes is in a straight line thereby obviating the setting up of a binding action between the dippers and tubes.

Means are provided to catch drippings from the nozzle members during the period of transferring of filled receptacles from the shelf 80ᵃ to the receptacle transporting conveyor, and comprising (Figures 68 and 69) a pan 103 fixed at the opposite ends to and carried by slides 103' whereby it is slidably mounted in slideways 103ᵃ to be adjusted to position below the outlet means 101 and to the rear thereof. The pan is actuated to position below the nozzles simultaneously with the movement of the transfer frame 81 to transfer receptacles from the shelf 80ª to the conveyor, and is effected from the actuating means for said receptacle transferring frame. For this purpose the other arm of the lever 81ª, indicated at 103ᵇ, is extended upward through an opening in table T and connected by a link 103ᶜ to a rod 103ᵈ fixed at the ends in ears extended upward from the pan carrying slides 103'. The pan has outlet means 103ᵉ to draw the contents therefrom.

While I have described and illustrated one embodiment of the invention it will be obvious that various modifications may be made in construction and arrangement of parts without departing from the scope of the invention, and that portions of the invention may be used without others and come within the scope of the invention.

Having thus described my invention, I claim:

1. The method of closing and sealing the open end of receptacles, consisting in collapsing the open receptacle and by squeezing together the opposite wall portions at the receptacle opening and holding the receptacle in collapsed condition, providing a closure member of V shape in cross section with the end of a leg at each end extended beyond the end of the opposite leg, engaging the closure member on the collapsed receptacle end with the extended leg portions projecting beyond the sides of the receptacle, clamping and sealing the body portion of the closure member to the receptacle end, and then folding the extended leg portions about the ends of the other leg, clamping and sealing the same to the body of the closure member and the ends of the closure member to the receptacle.

2. The method of closing and sealing the open end of a receptacle, consisting in squeezing together the opposite wall portions at the receptacle opening to close the same and holding the same in said condition, providing a closure member of V shape in cross section and having one leg of greater length than the other leg, engaging the closure member on the collapsed receptacle end with the ends of the leg of greater length extended beyond the sides of the receptacle, clamping and simultaneously longitudinally fluting the material of the body of the closure member to interlock the same with the interposed material of the receptacle to seal the body of the closure member in liquid tight connection to the receptacle, and then folding the extended ends of the one leg about the end of the other leg, clamping and offsetting the same into the flute of the body of the closure member to seal the ends of the body in liquid tight connection to the receptacle.

3. In apparatus for closing and sealing the open end of a receptacle, a pair of members supported to have movement toward and away from each other and between which members the open end of the receptacle is positioned, means to actuate said members, and said members adapted to close the open receptacle end during the movement of the members toward each other by engaging and collapsing the open receptacle end, engaging a closure member on the collapsed receptacle end having a portion of greater length than the width of the collapsed receptacle end and projecting beyond the sides of the receptacle, and said actuating means then being operative to further move and engage another part thereof with and clamp the closure member to the receptacle, and means to fold the projecting end portions of the closure member about the sides of the receptacle.

4. In apparatus for closing and sealing the open end of a receptacle, a pair of main slides supported to have movement toward and away from each other and a pair of auxiliary slides movable with and relative to the main slides and adapted for the engagement of an open receptacle end between the same, means to actuate said slides to effect engagement of the receptacle by the auxiliary slides to squeeze together the opposite wall portions of the receptacle to close the same, engaging a closure member of V shape in cross section upon the closed receptacle end, one leg of the closure member being of greater length than and projecting beyond the opposite sides of the receptacle, and said actuating means then being operative to further move and engage the main slides with the closure member above the axiliary slide to clamp the same to the receptacle end, and means to fold the extended ends of the one leg of the closure member about the ends of and against the other leg of the closure member.

5. Apparatus for closing and sealing the open end of a receptacle as claimed in claim 4, wherein the main slides are arranged with means to offset and interlock the material of the closure member with the interposed material of the receptacle as the closure member is clamped to the receptacle to seal the closure member thereto.

6. In apparatus for closing and sealing the open end of a receptacle, a conveyor arranged with receptacle supports, means relative to which receptacles on the conveyor are successively positioned and operative in succession to squeeze together the opposite wall portions at the open receptacle end to close the same, and then engage a closure member placed on the closed receptacle end with portions of said member extended beyond the opposite sides of the receptacle to clamp and secure the closure member to the receptacle, and means relative to which the receptacle is then positioned by the conveyor to fold the extended portions of the closure member about the ends of the closure member and sides of the receptacle.

7. In apparatus for closing and sealing the open end of a receptacle as claimed in claim 6, means operative in timed sequence with the actuation of the conveyor and the means to close, apply the closure member thereto and fold the ends thereof about the sides of the receptacle to lift receptacles from the conveyor and present them to said means and after actuation of the closure member applying and end folding means repositioning the receptacles on the conveyor.

8. In apparatus for closing and sealing the open end of receptacles, an intermittently operative conveyor arranged with receptacle supports, means superposed to the conveyor to squeeze together opposite wall portions at the open end of a receptacle to close the same and apply a closure member to the closed receptacle end and relative to which receptacles on the conveyor are successively stationed, and means to lift a receptacle from a support of the conveyor and position it relative to said closing and closure applying means and return it to its support on the conveyor, said means being operative in timed sequence with the operation of the means to close and apply the closure member to the receptacle and the conveyor and comprising a plunger movable axially of the receptacle in a direction toward and away from the receptacle closing and closure member applying means, means carried by the plunger to support and clamp the receptacle to said means, and means operative from the plunger as it is moved toward the receptacle closing and closure member applying means to actuate the receptacle clamping means to clamping position and to receptacle releasing position as the plunger is returned to initial position.

9. Apparatus for closing and sealing receptacles as claimed in claim 8, wherein the means to support and clamp the receptacles thereto comprises members pivotally carried by and at opposite sides of the axis of the plunger to have movement toward and away from each other on axes transverse of the plunger and yieldingly urged in a direction toward each other, and means operative in the normal position of the plunger to move said members in a direction away from each other and retain them in said position and operative to release said members when engaging a receptacle and permit of movement thereof toward the receptacle supported thereby.

10. In apparatus for closing and sealing the open end of a receptacle, an intermittently operative conveyor arranged with receptacle supporting plates having transverse parallel slots therein, means superposed to the conveyor to squeeze together opposite wall portions of a receptacle at the open end to close the same and apply a closure member thereto and relative to which means the receptacles on the conveyor are successively stationed, and means to lift a receptacle from a support of the conveyor and position it relative to said closing and closure applying means and return it to its support on the conveyor, said means being operative in timed sequence with the receptacle closing and closure applying means and the conveyor and comprising a plunger movable axially of the receptacle on and transversely of the receptacle support of the conveyor, and means carried by and movable by the movement of the plunger through the slots of a receptacle support of the conveyor positioned relative thereto and arranged for the engagement and support of the receptacle at the bottom and clamping about the marginal portions of the receptacle bottom to releasably secure the receptacle thereto, and means operative by the movement of the plunger to move said latter means into and out of receptacle clamping position.

11. In apparatus for closing and sealing the open end of a receptacle, means to collapse the open end of a receptacle and apply a closure member thereto, and means operative to recess the marginal portion of a web, intermittently feed the web by the recessing means distances equal to the space between the recesses, form the fed portion of the web to V shape in cross section and position the formed portion of the web over the collapsed receptacle end relative to the closure member applying means by the successive movement of the web, and cutter mechanism operative by the actuation of the closure member applying means to sever the formed portion of the web transversely intermediate the ends of a recess to constitute a closure member arranged with one leg of greater length than and extending beyond the ends of the other leg, and the closure member applying means being operative to clamp and seal the body portion of the closure member to the receptacle end.

12. In apparatus for closing and sealing the open end of a receptacle as claimed in claim 11, means to fold the extended ends of the one leg of the closure member about the collapsed sides of the receptacle and embrace the other leg of said member.

13. In apparatus for closing and sealing the open end of a receptacle, means to collapse the open end of a receptacle and apply a closure member thereto, and means for feeding a web, forming a closure member therefrom and engaging the closure member over the collapsed receptacle end relative to the closure member applying means, comprising a punch and die, a reciprocatory carrier therefor arranged for guiding the web relative to the die and the punch cooperating with the die to recess the marginal portion of the web and adapted to engage a formed recess during the movement of the carrier in one direction to feed the web and withdrawn from the recess at the termination of the web feeding movement of the carrier and retained in such position during the retrograde movement thereof, dies interposed between the punch and die carrier and receptacle collapsing and closure member applying means to which the web is delivered from the punch and die carrier operative to form the fed portion of the web to V shape in cross section with the recess extending transversely of a leg thereof and said web upon the successive movement of the punch and die carrier positioning the shaped portion of the web between relative to the closure member applying means to constitute a closure member to be applied to the collapsed receptacle end, a cutter block relative to which the formed portion of the web is positioned as it is delivered to the closure member applying means, and a cutter carried by the closure member applying means operative by the closure member applying movement thereto to apply the closure member to the receptacle to co-operate with the cutter block to sever the web intermediate the ends of a recess to constitute the closure member of V shape in cross section with the one leg extending beyond the ends of the other leg.

14. In receptacle closing apparatus, means to collapse the open end of a receptacle and apply a closure member thereto, actuating means for the collapsing and closure member applying means operative to engage a part of said latter means with and collapse a receptacle end positioned relative thereto, web recessing and feeding means embodying a reciprocatory die carrier arranged to guide a web to the die and a punch carried by the die carrier to have movement relative to and co-operate with the die to recess the marginal portion of the web and retained in the formed recess during the advancing movement of the carrier in one direction to feed the web, means to reciprocate the carrier, means to actuate the punch to recess the web at the termination of the retrograde movement of the carrier and withdraw the punch from the web recess at the termination of the web feeding movement of the carrier and the punch retained in said position during the retrograde movement of the carrier, means to which the fed portion of the web is delivered to form the same to V shape in cross section and said formed portion of the web upon the successive movement of the web adapted to be positioned above the collapsed receptacle end relative to the closure applying means, and means to sever said positioned portion of the web intermediate the ends of a recess, said severed portion constituting a closure member arranged with portions extending beyond opposite sides of the collapsed receptacle end, and said severing means being operative by the closure applying means in the further actuation thereof to engage and seal the closure member to the collapsed receptacle end, and means to fold the extended portions of the closure member about the ends of the closure member.

15. Receptacle closing apparatus as claimed in claim 14, wherein the punch of the web recessing means is slidably mounted in the carrier, and the means to actuate the punch comprises a rocker mounted on the carrier and operatively connected with the punch, and an actuator operative to actuate the rocker at the termination of the retrograde movement of the carrier to impart web recessing movement to the punch and at the termination of the web feeding movement of the carrier to withdraw the punch from the web recess.

16. Receptacle closing apparatus as claimed in claim 14, wherein the punch of the web recessing means is slidably mounted in the carrier, and the means to actuate the punch comprises a rocker mounted on the carrier and operatively connected with the punch, a slide reciprocatory in the plane of movement of the carrier and having laterally projecting and spaced ears, and means to actuate the slide to engage one of the ears with and actuate the rocker at the termination of the retrograde movement of the carrier to impart the web recessing movement to the punch and at the termination of the web feeding movement of the carrier engage the other ear with and actuate the rocker to withdraw the punch from the web recess.

17. In receptacle closing apparatus as claimed in claim 14, means to render the punch actuating means operative and inoperative during the reciprocation of the carrier.

18. Receptacle closing apparatus as claimed in claim 14, wherein the means to actuate the punch of the web recessing means comprises a rocker mounted on the carrier and operatively connected with the punch, a rocker actuating slide having a pair of laterally projecting and spaced ears, a second slide arranged in juxtaposed and parallel relation with the first slide, means to reciprocate the second slide, and means to releasably couple the slides together to move in unison, and said first slide being adapted to engage one ear thereof with and actuate the rocker at the termination of the retrograde movement of the carrier to impart web recessing movement to the punch and at the termination of the web feeding movement of the carrier engage the other ear with and actuate the rocker to withdraw the punch from the web recess, and means to actuate the slide coupling means to uncouple and couple the slides and thereby render the punch rocker operative and inoperative to impart the web recessing and withdrawing movements to the punch.

19. In receptacle closing apparatus, the combination with means to collapse the open end of a receptacle and apply a closure member thereto, of means to form a web to V shape in cross section, means to feed in succession predetermined lengths of the web to said forming means and advance the formed portion of the web to position over the closed receptacle and relative to the closure applying means, means to sever the formed portion of the web over the receptacle preparatory to the closure applying movement of the closure applying means, and means relative to which the web is moved during the feeding movement thereof operative to make an impression on the web.

20. Receptacle closing apparatus as claimed in claim 19, wherein the impression making means comprises a pair of wheels between which the web is delivered, one of said wheels have symbols disposed about the periphery and impressing said symbols into the material of the web.

21. Receptacle closing apparatus as claimed in claim 19, wherein the impression making means comprises a pair of wheels between which the web is delivered, one of said wheels having symbols disposed about the periphery and impressing said symbols into the material of the web, and means to variably adjust the symbol carrying wheel relative to the other wheel.

22. Receptacle closing apparatus as claimed in claim 14, wherein the means to form the web to V shape in cross section comprises a die member having a rib extended in the plane of travel of the web and relative to which the web is guided as it is fed by the web recessing means, and a second die member movable toward and away from the first die member and having a recess in the face opposed to the first die conforming in shape to the rib, and means operative during periods of rest of the web to move the second die toward and away from the first die.

23. Receptacle closing apparatus as claimed in claim 14, wherein the means to sever the formed portion of the web comprises a cutter block arranged as a guide to which the formed web is delivered from the web forming means, and a cutter carried by the closure member applying means co-operating with the cutter block during the closure member applying movement thereof.

24. In receptacle closing apparatus, an intermittently operative receptacle carrying conveyor, means relative to which the receptacles are stationed by the conveyor to collapse the open receptacle end and apply a closure member thereto, means for actuating said receptacle collapsing and closure applying means operative to collapse the receptacle, means to form from a web successive closure members of V shape in cross section with one leg thereof of greater length than and extending beyond the ends of the other leg and placing the same over the collapsed receptacle end relative to the closure applying means with the ends of the longer leg extending from opposite sides of the receptacle, and the closure applying means thereupon being further operated by its actuating means to clamp and seal the body portion of the closure member to the collapsed receptacle end, and means relative to which the receptacles with closure members having a body portion clamped thereto are stationed by the conveyor to fold the extended ends of the one leg of the closure member about the sides of the receptacle and to embrace the shorter leg.

25. In receptacle closing means as claimed in claim 24, means carried by the closure member applying means operative by the movement of said latter means to fold the extended ends of the one leg to extend transversely of the body of the closure member at the opposite ends thereof.

26. Receptacle closing means as claimed in claim 24, wherein the means to fold the extended ends of the closure member about the sides of the receptacle comprises a head relative to which the closure member on the receptacle is positioned by the conveyor and the means to fold the extended ends of the closure member are carried by said head.

27. Receptacle closing means as claimed in claim 24, wherein the closure member applying means are arranged to longitudinally flute the body of the closure member to interlock the same in liquid tight connection with the interposed material of the receptacle, and the means to fold the extended ends of the closure member about the sides of the collapsed receptacle end comprises a head having a part arranged to conform to the fluted closure member and relative to which the closure member on the receptacle is positioned, and means movably carried by the head arranged to engage and fold the extended closure ends and simultaneously flute the portions embracing the one leg of the closure.

28. Receptacle closing means as claimed in claim 24, wherein the means to fold the extended ends of the closure member about the sides of the collapsed receptacle end comprises a head arranged with a longitudinal channel, a block mounted upon a wall and within the channel of the head having the face arranged to conform to the fluted closure member and normally urged to a predetermined position within the head channel, and rollers slidably mounted on and within the other channel wall in opposed relation to the block and reciprocatory relative to each other longitudinally of the head and having the periphery arranged to conform to the face of the block, said rollers being adapted to fold the extended closure ends to embrace one leg of the closure member and simultaneously shape the same to conform to the fluted closure member, and said head arranged with means to guide the receptacle end with the closure thereon to said means, and means to actuate said rollers.

29. Receptacle closing apparatus as claimed in claim 24, wherein the means to fold the extended ends of the closure member comprises a head, a block yieldingly mounted on the head, a pair of rollers mounted on and spaced longitudinally of the head in opposed relation to the block, and the head arranged with means to guide the receptacle end with the closure member thereon relative to the block and between the rollers, and means to reciprocate the rollers relative to each other and during the movement thereof toward each other fold the extended ends about the ends of the closure member.

30. Receptacle closing apparatus as claimed in claim 24, wherein the means to fold the extended ends of the closure member comprises a head, a block yieldingly mounted on the head, a pair of rollers, carriers for said rollers slidably mounted on the head to space the rollers longitudinally of the head and opposed to the block and relative to which block and between the rollers the receptacle end with the closure is adapted to be positioned, and means to reciprocate the roller carriers relative to each other and said rollers as the carriers are moved toward each other folding the extended ends about the ends of the closure member.

31. Receptacle closing apparatus as claimed in claim 24, wherein the means to fold the extended ends of the closure member comprises a head, a block yieldingly mounted on the head, a pair of rollers, carriers for said rollers slidably mounted on the head to space the rollers longitudinally of the head and opposed to the block and relative to which block and between the rollers the receptacle end with the closure member is adapted to be positioned, a pivotally supported plate arranged with cam slots at opposite sides of its pivotal support, cam followers mounted on the roller carriers one cam follower engaging one cam slot and the other cam follower engaging the other cam slot in the plate, and means to oscillate the plate and thereby reciprocate the roller carriers to move the rollers relative to each other, and said rollers as they are moved toward each other folding the extended ends about the ends of the closure member.

32. In receptacle closing and closure member applying apparatus, an intermittently operative conveyer arranged with receptacle supports, means at which the receptacles on the receptacle supports of the conveyer are stationed to collapse the open end of the receptacle to close the same and to seal to the receptacle the body portion of a V-shaped closure member having the ends of one leg extended beyond the ends of the other leg engaged upon the collapsed receptacle end with the extended end portions of the one leg extending beyond the sides of the receptacle, means relative to which the receptacles on the conveyer with closure members having the body portion sealed thereto are successively stationed to fold the extended ends of the closure member about the sides of the receptacle, and said means being operative during the closing and applying a closure member to a following receptacle and during the periods of rest of the conveyer, and means to lift the receptacles from the conveyer and position the same relative to the receptacle closing means and closure member applying means.

33. In receptacle closing apparatus as claimed in claim 32, means relative to which the closed receptacles with the sealed closure member applied thereto are successively stationed by the conveyer to eject receptacles from the conveyor.

ELLIS L. JONES.